(12) United States Patent
Chelba

(10) Patent No.: US 9,336,771 B2
(45) Date of Patent: May 10, 2016

(54) SPEECH RECOGNITION USING NON-PARAMETRIC MODELS

(71) Applicant: Google Inc., Mountain View, CA (US)

(72) Inventor: Ciprian I. Chelba, Palo Alto, CA (US)

(73) Assignee: Google Inc., Mountain View, CA (US)

(*) Notice: Subject to any disclaimer, the term of this patent is extended or adjusted under 35 U.S.C. 154(b) by 281 days.

(21) Appl. No.: 13/895,582

(22) Filed: May 16, 2013

(65) Prior Publication Data
US 2015/0371633 A1 Dec. 24, 2015

Related U.S. Application Data

(60) Provisional application No. 61/721,097, filed on Nov. 1, 2012.

(51) Int. Cl.
G10L 15/22 (2006.01)
G10L 15/06 (2013.01)
G10L 15/14 (2006.01)
G10L 15/02 (2006.01)

(52) U.S. Cl.
CPC ............ *G10L 15/063* (2013.01); *G10L 15/144* (2013.01); *G10L 2015/025* (2013.01)

(58) Field of Classification Search
CPC ....................................................... G10L 15/22
USPC ........................................................ 704/240
See application file for complete search history.

(56) References Cited

U.S. PATENT DOCUMENTS

| 4,759,068 | A | * | 7/1988 | Bahl | ................ | G10L 15/14 |
| | | | | | | 704/240 |
| 4,817,156 | A | * | 3/1989 | Bahl | ................ | G10L 15/14 |
| | | | | | | 704/244 |
| 4,819,271 | A | * | 4/1989 | Bahl | ................ | G10L 15/144 |
| | | | | | | 704/242 |
| 5,018,088 | A | * | 5/1991 | Higbie | ............. | H03H 21/0012 |
| | | | | | | 702/194 |
| 5,033,087 | A | * | 7/1991 | Bahl | ................ | G10L 15/14 |
| | | | | | | 704/245 |
| 5,268,990 | A | * | 12/1993 | Cohen | ............... | G09B 19/04 |
| | | | | | | 704/200 |

(Continued)

FOREIGN PATENT DOCUMENTS

| CN | 1211026 | 3/1999 |
| CN | 1233803 | 11/1999 |
| EP | 0953970 | 11/1999 |

OTHER PUBLICATIONS

Segura, José C., et al. "Cepstral domain segmental nonlinear feature transformations for robust speech recognition." Signal Processing Letters, IEEE11.5 (2004): 517-520.*

(Continued)

*Primary Examiner* — Tammy Pham
*Assistant Examiner* — Edwin S Leland, III
(74) *Attorney, Agent, or Firm* — Fish & Richardson P.C.

(57) ABSTRACT

Methods, systems, and apparatus, including computer programs encoded on a computer storage medium, for using non-parametric models in speech recognition. In some implementations, speech data is accessed. The speech data represents utterances of a particular phonetic unit occurring in a particular phonetic context, and the speech data includes values for multiple dimensions. Boundaries are determined for a set of quantiles for each of the multiple dimensions. Models for the distribution of values within the quantiles are generated. A multidimensional probability function is generated. Data indicating the boundaries of the quantiles, the models for the distribution of values in the quantiles, and the multidimensional probability function are stored.

20 Claims, 12 Drawing Sheets

(56) References Cited

U.S. PATENT DOCUMENTS

| | | | | |
|---|---|---|---|---|
| 5,502,791 A * | 3/1996 | Nishimura | G10L 15/142 | 704/256 |
| 5,625,749 A * | 4/1997 | Goldenthal | G10L 15/02 | 704/237 |
| 5,679,001 A * | 10/1997 | Russell | G09B 19/04 | 434/185 |
| 5,729,656 A * | 3/1998 | Nahamoo | G10L 15/04 | 704/254 |
| 5,758,024 A * | 5/1998 | Alleva | G06F 17/2715 | 704/254 |
| 5,839,105 A * | 11/1998 | Ostendorf | G10L 15/144 | 704/231 |
| 5,937,384 A * | 8/1999 | Huang | G06K 9/6297 | 704/251 |
| 5,953,701 A | 9/1999 | Neti et al. | | |
| 6,038,533 A * | 3/2000 | Buchsbaum | G10L 13/027 | 704/255 |
| 6,108,627 A * | 8/2000 | Sabourin | G10L 15/187 | 704/10 |
| 6,141,641 A * | 10/2000 | Hwang | G10L 15/26 | 704/243 |
| 6,151,575 A * | 11/2000 | Newman | G10L 15/07 | 704/231 |
| 6,243,680 B1 * | 6/2001 | Gupta | G10L 15/06 | 704/258 |
| 6,256,607 B1 * | 7/2001 | Digalakis | G10L 15/02 | 704/222 |
| 6,374,216 B1 * | 4/2002 | Micchelli | G10L 15/063 | 704/231 |
| 6,421,641 B1 * | 7/2002 | Huang | G10L 15/07 | 704/230 |
| 6,470,314 B1 * | 10/2002 | Dharanipragada | G10L 15/07 | 704/231 |
| 6,591,235 B1 * | 7/2003 | Chen | G06K 9/6226 | 704/236 |
| 6,681,206 B1 * | 1/2004 | Gorin | G06F 17/2755 | 704/243 |
| 7,035,789 B2 * | 4/2006 | Abrego | G10L 15/197 | 704/1 |
| 7,085,720 B1 * | 8/2006 | Gorin | G10L 15/24 | 704/231 |
| 7,113,903 B1 * | 9/2006 | Riccardi | G06F 17/2775 | 704/2 |
| 7,310,600 B1 * | 12/2007 | Garner | G10L 15/12 | 704/234 |
| 7,444,282 B2 * | 10/2008 | Choo | G10L 15/04 | 704/201 |
| 7,447,635 B1 * | 11/2008 | Konopka | G10L 15/22 | 704/231 |
| 7,467,087 B1 * | 12/2008 | Gillick | G10L 15/26 | 704/235 |
| 7,650,331 B1 * | 1/2010 | Dean | G06F 9/5066 | 712/203 |
| 8,620,662 B2 * | 12/2013 | Bellegarda | G10L 13/06 | 704/260 |
| 9,008,329 B1 * | 4/2015 | Mandel | G10K 15/00 | 381/71.1 |
| 2002/0040296 A1 * | 4/2002 | Kienappel | G10L 15/02 | 704/220 |
| 2002/0087314 A1 * | 7/2002 | Fischer | G10L 15/07 | 704/255 |
| 2002/0087317 A1 * | 7/2002 | Lee | G06Q 30/06 | 704/257 |
| 2002/0165713 A1 * | 11/2002 | Skoglund | G10L 25/78 | 704/240 |
| 2003/0110035 A1 * | 6/2003 | Thong | G10L 15/083 | 704/254 |
| 2004/0030556 A1 * | 2/2004 | Bennett | G06F 17/27 | 704/270 |
| 2004/0088163 A1 * | 5/2004 | Schalkwyk | G10L 15/187 | 704/251 |
| 2004/0215457 A1 * | 10/2004 | Meyer | G10L 15/06 | 704/251 |
| 2005/0256715 A1 * | 11/2005 | Okimoto | G06F 17/2715 | 704/257 |
| 2006/0020461 A1 * | 1/2006 | Ogawa | G10L 15/04 | 704/251 |
| 2006/0031069 A1 * | 2/2006 | Huang | G10L 13/08 | 704/243 |
| 2006/0116997 A1 * | 6/2006 | Yu | G10L 15/04 | |
| 2006/0149558 A1 * | 7/2006 | Kahn | G10L 15/063 | 704/278 |
| 2007/0011010 A1 * | 1/2007 | Dow | G10L 15/30 | 704/270.1 |
| 2007/0027698 A1 * | 2/2007 | Daul | G06Q 40/08 | 705/1.1 |
| 2008/0114595 A1 * | 5/2008 | Vair | G10L 15/08 | 704/236 |
| 2008/0262828 A1 * | 10/2008 | Och | G06F 17/2818 | 704/3 |
| 2008/0281857 A1 * | 11/2008 | Dymetman | G06F 17/30911 | |
| 2009/0119103 A1 * | 5/2009 | Gerl | G10L 17/04 | 704/243 |
| 2010/0070263 A1 * | 3/2010 | Goto | G06F 17/30746 | 704/8 |
| 2010/0070277 A1 * | 3/2010 | Arakawa | G10L 15/02 | 704/246 |
| 2014/0135964 A1 * | 5/2014 | Eom | G06F 17/30743 | 700/94 |

OTHER PUBLICATIONS

"Vector Quantization" Data-Compression.com, a website devoted to the principles and practice of data compression, 6 pages, http://www.data-compression.com/vq.html (accessed Aug. 2012).

Banjeree, Pratyush et al., "Application of Triphone Clustering in Acoustic Modeling for Continuous Speech Recognition in Bengali," 19th International Conference on Pattern Recognition, 2008. (ICPR 2008), 4 pages.

Brants et al. "Large language models in machine translation," Proceedings of the 2007 Joint Conference Empirical Methods in Natural Language Processing and Computational Natural Language Learning (EMNLP-CoNLL), 2007, p. 858-867 (10 pages).

Brants et al., "Distributed language models," in HLT-NAACL (Tutorial Abstracts) '09, 2009, pp. 3-4 (2 pages).

Chang et al., "Bigtable: A distributed storage system for structured data," ACM Transactions on Computer Systems (TOCS), 2008, 26(2):1-26 (28 pages).

Chelba et al., "Distributed acoustic modeling with back-off n-grams," in Proceedings of ICASSP, Kyoto, Japan, Mar. 2012, pp. 4129-4132. (4 pages).

Chelba et al., "Query language modeling for voice search," in Spoken Language Technology Workshop (SLT), 2010, 127-132 (6 pages).

Coxhead, "A Glossary of Linguistic Terms," University of Birmingham, School of Computer Science www.cs.bham.ac.uk/~pxc/nlpa/nlpgloss.html (accessed Jun. 7, 2012) (16 pages).

Dean et al., "MapReduce: simplified data processing on large clusters," Commun. ACM, 2008, 51:107-113 (10 pages).

Gales et al., "Progress in the CU-HTK broadcast news transcription system," Audio, Speech, and Language Processing, IEEE Transactions on, 2006, 14(5):1513-1525 (16 pages).

Gales, "Semi-tied covariance matrices for hidden markov models," IEEE Transactions in Speech and Audio Processing, 1999, 7:272-281 (10 pages).

Gauvain, J.L. et al., "Developments in Continuous Speech Dictation using the ARPA WSJ Task," Proc. IEEE ICASSP-95, 1995, 4 pages, ftp://192.44.78.170/public/ica95lv.pdf.

Halevy et al., "The unreasonable effectiveness of data," IEEE Intelligent Systems, 2009, 24(2):8-12 (5 pages).

Kim et al., "Recent advances in broadcast news transcription," Automatic Speech Recognition and Understanding, ASRU'03. IEEE Workshop on. IEEE, 2003, pp. 1-6 (8 pages).

Kovacek, David M., "Final Office Action" in U.S. Appl. No. 13/539,225, United States Patent & Trademark Office, Mar. 29, 2013, 35 pages.

Kovacek, David M., "Non-Final Office Action" in U.S. Appl. No. 13/539,225, United States Patent & Trademark Office, Oct. 3, 2012, 26 pages.

Mohri et al., "Weighted finite-state transducers in speech recognition," Computer Speech & Language, 2002, 16 (1):69-88 (27 pages).

(56) References Cited

OTHER PUBLICATIONS

Niesler, T.R. and P.C. Woodland. "Variable-length category-based n-grams for language modelling", Technical report CUED/FINFENG/Tr.215, Department of Engineering, University of Cambridge, U.K., Apr. 1995.

Notification of Transmittal of the International Search Report and the Written Opinion of the International Searching Authority, or the Declaration issued in PCT/IS2012/045039 on Dec. 18, 2012, 11 pages.

Novotney, Scott et al., "Unsupervised Acoustic and Language Model Training With Small Amounts of Labelled Data," IEEE International Conference on Acoustics, Speech and Signal Processing, 2009 (ICASSP 2009.), 4 pages http://old-site.clsp.jhu.edu/people/snovotne/papers/novotney_icassp09.pdf.

Opsasnick, Michael N., Non-final Office Action in U.S. Appl. No. 13/539,284, United States Patent & Trademark Office, Sep. 11, 2012, 10 pages.

Popescu, Vladimir et al, "Parallel training algorithms for continuous speech recognition, implemented in a message passing framework", 14th European Signal Processing Conference (EUSIPCO 2006), Sep. 8, 2006, pp. 1-5, Florence, Italy, Retrieved from the Internet on Dec. 7, 2012: URL:http://www.eurasip.org/Proceedings/Eusipco/Eusipco2006/papers/1568981978.pdf, 4 pages.

Povey et al., "Boosted MMI for model and feature space discriminative training," in Proceedings of ICASSP, 2008, pp. 1-4 (4 pages).

Reynolds, D. A., "Gaussian Mixture Models, Encyclopedia of Biometric Recognition," Springer (2008). 5 pages http://www.ll.mit.edu/mission/communications/ist/publications/0802_Reynolds_Biometrics-GMM.pdf.

Rybach, David et al, "Advances in Arabic Broadcast News Transcription at RWTH", Automatic Speech Recognition & Understanding, 2007. ASRU. IEEE Works Hop on, IEEE, PI, Dec. 1, 2007, pp. 449-454.

Schwartz et al., "Improved Hidden Markov modeling of phonemes for continuous speech recognition," in Proceedings of ICASSP, 1984, 9:21-24 (4 pages).

Vitter, "Random sampling with a reservoir," ACM Transactions on Mathematical Software (TOMS), 1985, 11(1):37-57 (21 pages).

Watanabe et al., "Variational bayesian estimation and clustering for speech recognition," IEEE Transactions on Speech and Audio Processing, 2004, 12(4):365-381 9 (17 pages).

Young et al., "The HTK Book," Cambridge University Engineering Department, Cambridge, England, 2002, 384 pages.

Young et al., "Tree-based state tying for high accuracy acoustic modeling," in Proceedings ARPA Workshop on Human Language Technology, 1994, 307-312 (6 pages).

Zweig, Geoffrey et al., "Continuous Speech Recognition with a TF-IDF Acoustic Model," Interspeech 2010, 4 pages, http://research.microsoft.com/pubs/131332/tfidf_am.pdf.

Office Action issued in Chinese Application No. 201280031754.2 on Jun. 30, 2015, 9 pages (with English translation).

\* cited by examiner

SPEECH RECOGNITION USING NON-PARAMETRIC MODELS

CROSS-REFERENCE TO RELATED APPLICATIONS

This application claims the benefit of U.S. patent application Ser. No. 61/721,097, filed on Nov. 1, 2012, the contents of which are incorporated herein by reference in their entirety.

BACKGROUND

Speech recognition systems use acoustic models to transcribe utterances. Acoustic models are often trained using a set of training data that include recorded utterances. Typically, acoustic models include statistical data about the sounds that make up utterances in the training data.

SUMMARY

Distributed computing techniques can be used to train an acoustic model. The data used to train the acoustic model can include sequences of phonetic elements that each represent different phonetic contexts. Data identifying the sequences can be distributed to multiple processing modules that are each assigned to train a different portion of the acoustic model. To facilitate training of the acoustic model, data for sequences that include a common sequence of phonetic elements can be transmitted to the same processing module, permitting the processing module to efficiently train the assigned portion of the acoustic model. The processing module can train the acoustic model by generating non-parametric models for each of the training sequences that are assigned to it.

One innovative aspect of the subject matter described in this specification is embodied in methods that include the actions of: accessing speech data that represents utterances of a particular phonetic unit occurring in a particular phonetic context, the speech data comprising values for multiple dimensions; determining boundaries for a set of quantiles for each of the multiple dimensions; generating models for the distribution of values within the quantiles; generating a multidimensional probability function that indicates, for input speech data representing speech occurring in the particular phonetic context, a probability that the input speech data will have values that correspond to a given set of the quantiles for the multiple dimensions; and storing data indicating the boundaries of the quantiles, the models for the distribution of values in the quantiles, and the multidimensional probability function.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, generating the multidimensional probability function comprises generating a multidimensional probability function that indicates, for an input speech frame representing speech occurring in the particular phonetic context, a probability that the input speech frame will have values that correspond to a given set of the quantiles for the multiple dimensions, where the input speech frame is a multidimensional real-valued vector. Determining the boundaries for the set of quantiles for each of the multiple dimensions comprises determining the boundaries for equal occupancy quantiles such that each of the equal occupancy quantiles includes an equal number of values from the accessed speech data, each equal occupancy quantile representing a range of values in a dimension that does not overlap with any other equal occupancy quantile. Generating models for the distribution of values within the quantiles comprises generating, for each of the quantiles, a univariate Gaussian distribution based on values in the speech data that correspond to the quantile. Generating the multidimensional probability function comprises generating an n-gram model wherein the n-grams are sequences of quantile identifiers and the sequences include quantile identifiers for quantiles in at least two dimensions. Generating the multidimensional probability function comprises determining the number and identity of the n-grams for which data is included in the n-gram model based on the accessed speech data. Determining boundaries for the set of quantiles for each of the multiple dimensions comprises determining the boundaries such that the number of quantiles in the set of quantiles for each of the multiple dimensions is based on the accessed speech data.

Advantageous implementations can include one or more of the following features. An acoustic model that recognizes phonetic contexts of many varying sizes can be trained. The training process for the acoustic model can use large amounts of input data. The accuracy of an acoustic model can be enhanced.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
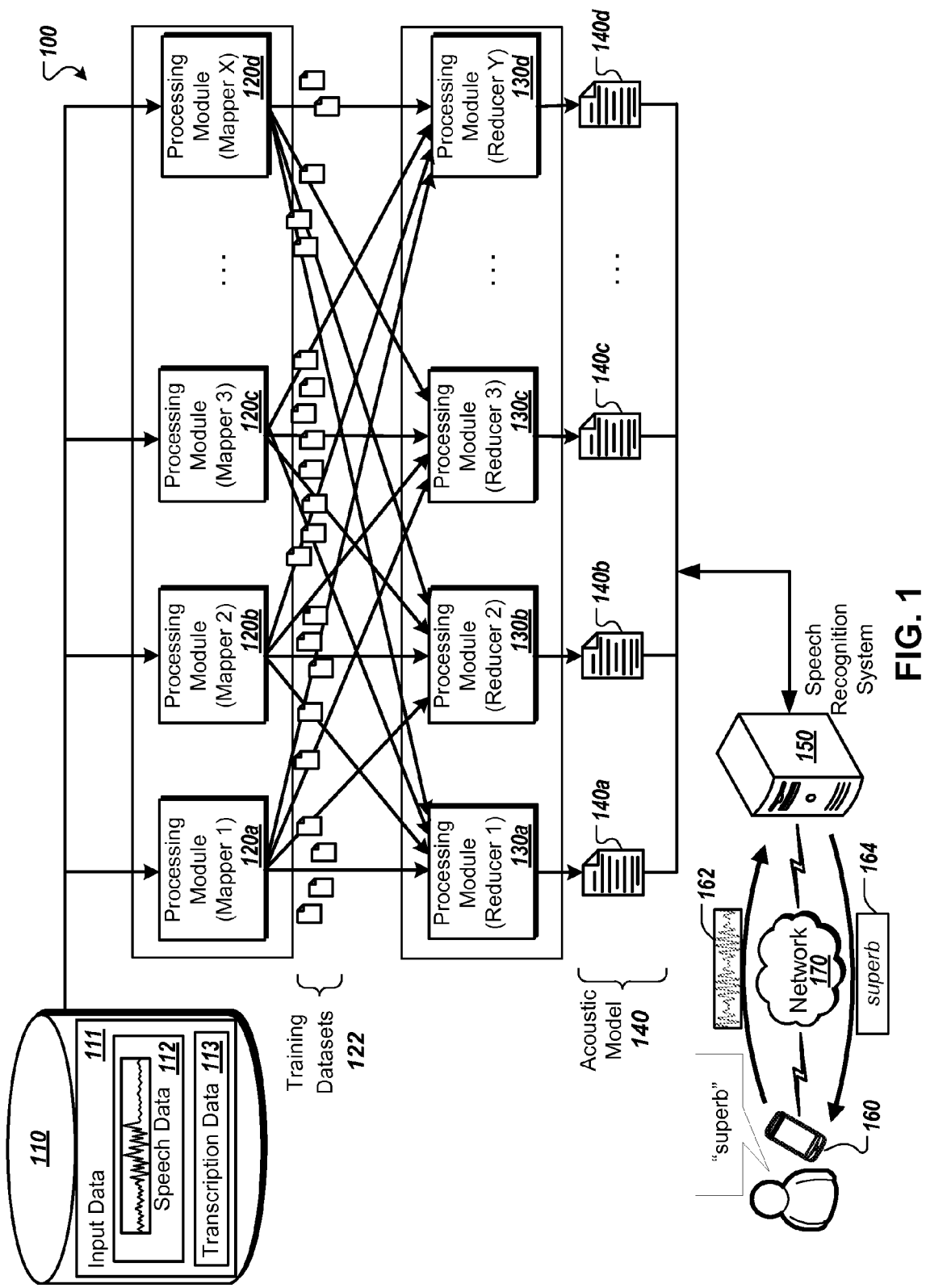
FIG. 1 is a diagram that illustrates an example of a system for training an acoustic model.

An acoustic model can be used to assign a score to an acoustic frame using sub-word modeling units (e.g., phones) that are context dependent. The scores produced by the acoustic model can be used to identify a transcription for a set of acoustic frames, or to evaluate the likelihood that a particular transcription is correct. In some implementations, the sub-word modeling units, or phones, are each modeled by a Hidden Markov model (HMM), typically having three states. Non-parametric models can be used to assign likelihood scores to one or more multi-dimensional acoustic frames. A likelihood score can indicate the likelihood that an acoustic frame corresponds to a particular state of a particular phone.

Generally, a non-parametric model refers to a model for which one or more aspects of the model's structure are not specified a priori. Instead, one or more aspects of the model's structure are determined from the data on which the model is based (e.g., training data). A non-parametric model does not indicate that no parameters are used. Rather, the number and nature of the parameters are flexible and one or more parameters may not be fixed in advance.

As described further below, an acoustic model can be trained using a variety of phonetic contexts of differing lengths. For example, the acoustic model can be trained with training sequences that respectively include one, two, three, or more phones before and/or after a central phone.

Many typical acoustic models are trained using use between 100 and 1000 hours of training data. Typical training processes are often unable to make advantageous use of more than 1000 hours of training data. In addition, the computational expense of processing a larger amount of training data is impractical for many training methods. However, using the techniques described below, an acoustic model can be trained using several thousand hours of training data, tens of thousands of hours of training data, a hundred thousand hours of training data, or more. The distributed computing framework described below can facilitate the processing required to use large training data sets.

Distributed computing techniques can be used to train the acoustic model (e.g., to update an existing acoustic model or create a new acoustic model). In a distributed computing system, different processing modules are assigned to train different portions of the acoustic model. Each of the processing modules is assigned one or more partitioning keys that correspond to the portion of the acoustic model to be trained.

In the distributed system, speech data and a transcription for the speech data can be received. A phonetic representation for the transcription can be accessed, and training sequences can be extracted from the phonetic representation. The training sequences can include sequences that include a different set of contextual phones surrounding a particular phone in the phonetic representation. A partitioning key is identified based on a sequence of phones that occurs in each of the training sequences, such as a central sequence of three phones that occurs in each training sequence. Based on the partitioning key, a processing module is selected from a plurality of processing modules. Data identifying the training sequences and data identifying a portion of the speech data are transmitted to the selected processing module. The selected processing module can use the received data to train (e.g., update or generate) a portion of the acoustic model that is associated with the partitioning key.

FIG. 1 is a diagram that illustrates an example of a system 100 for training an acoustic model. The system 100 includes a number of processing modules, some of which are referred to as mappers 120a-120d and others referred to as reducers 130a-130d. The mappers 120a-120d access input data from one or more data storage devices 110, and generate related key-value pairs, which are illustrated as training datasets 122. The reducers 130a-130d each receive different subsets of the key-value pairs, and use the received data to generate or update an acoustic model 140. After training, the acoustic model 140 can be used by a speech recognition system 150 to generate transcriptions for speech. For example, the speech recognition system 150 can receive speech data from, and provide transcriptions to, a computing device 160 over a network 170.

The computing device 160 can be, for example, a desktop computer, a laptop computer, a cellular phone, a smartphone, a personal digital assistant (PDA), a tablet computer, a wearable computer, a navigation system, or another computing device. The operations performed by the speech recognition system 150 can be performed by individual computer systems or can be distributed across multiple computer systems. The speech recognition system accesses the acoustic model 140, stored on one or more data storage devices, which can be connected directly or over the network 170. The network 170 can be wired or wireless or a combination of both. The network 170 can include one or more public or private networks, and can include the Internet.

The processing modules in the system 100 can use the MapReduce process to perform the distributed training of the acoustic model 140. In this process, the mappers 120a-120d each perform map operations on different sets of input data, producing key-value pairs as map output. The key-value pairs are sent to the reducers 130a-130d, which combine values associated with the same key to produce a final output value for each key. Each reducer 130a-130d may be responsible for a different non-overlapping subset of the overall set of keys. In other words, each key may be assigned to a single reducer 130a-130d, so that data associated with the same key is processed by the same reducer 130a-130d. The distribution of data from the mappers 120a-120d to the reducers 130a-130d may be referred to as shuffling, and may result in each reducer receiving, from each mapper, the key-value pairs for which the reducer is responsible.

In further detail, the input data 111 used to train the acoustic model 140 includes speech data 112 and transcription data 113. The speech data 112 can include recorded audio that includes utterances and/or data describing utterances, such as feature vectors that describe speech characteristics. In some implementations, hundreds, thousands, or tens of thousands of hours of speech samples are used to train the acoustic model 140. The transcription data 113 can include transcriptions for the utterances included in the speech data 112. In some implementations, the speech data 112 and the corresponding transcription data 113 used to train the acoustic model 140 are selected so that the transcriptions have at least a minimum confidence level. For example, a speech sample can be selected for use in training when a confidence score for the corresponding transcription indicates that a speech recognizer has at least a minimum confidence (e.g., 70%, 80%, or 90%) in the transcription.

Different portions of the input data 111 are processed by different mappers 120a-120d. In some implementations, input data 111 can be organized into portions or "chunks" of data, and each mapper 120a-120d processes different portions of the input data 111. In some implementations, the system 100 can include one or more master processing modules (not shown) which assign and/or track the portions of the input data 111 that are processed by each mapper 120a-120d.

Based on the input data 111, the mappers 120a-120d generate key-value pairs as mapper outputs, where each key-value pair identifies a training sequence for training the acoustic model 140. Groups of related key-value pairs are illustrated as datasets 122. Nevertheless, each key-value pair can be transmitted independently to a reducer 130a-130d. A dataset 122 can include, for example, key-value pairs that each identify a training sequence with different amount of phonetic context around a particular phone in a particular instance of an utterance. The key-value pairs in each dataset 122 identify related training sequences that have particular characteristics in common, such as a central sequence of phones that occurs in each of the related training sequences.

The mappers 120a-120d output the key-value pairs in the datasets 122, and the key-value pairs are distributed to the various reducers 130a-130d in a shuffling phase. As described further below, the partitioning keys used for shuffling are defined so that each key-value pair in a given dataset 122 is transmitted to the same reducer 130a-130d. For example, the partitioning key associated with a training sequence can be based on a central sequence of phones in the training sequence. Because each related training sequence has the same central sequence, each key-value pair is associated with the same partitioning key, and is thus assigned to the same reducer 130a-130d (e.g., the reducer assigned to handle data associated with that partitioning key).

Each reducer 130a-130d is assigned one or more partitioning keys, and receives all of the key-value pairs associated with its assigned one or more partitioning keys. In some implementations, each partitioning key is assigned to exactly one reducer 130a-130d, so that the key-value pairs in each dataset 122 are transmitted to, and processed by, a single reducer 130a-130d. Each reducer 130a-130d is responsible for generating a particular partition 140a-140d of the acoustic model 140 that corresponds to its assigned one or more partitioning keys. Based on the key-value pairs that each reducer 130a-130d receives, each reducer 130a-130d aggregates training sequences and trains the assigned partition 140a-140d of the acoustic model 140 (e.g., by statistical analysis of the aggregated data for each assigned partitioning key). The acoustic model partitions 140a-140d, which store the reducer outputs, can be segments of a distributed (e.g., partitioned) associative array.

After training of the acoustic model 140, the speech recognition system 150 can access data in the acoustic model 140 using the same partitioning keys used to train the acoustic model 140. When audio data 162 is received from a computing device 160, the speech recognition system 150 can evaluate candidate transcriptions (e.g. hypotheses) for the audio data 162 using the acoustic model 140. For a given candidate transcription, a set of partitioning keys can be selected based on the phonetic characteristics of the candidate transcription. Acoustic model data that is associated with the selected partitioning keys is then retrieved from the associative array. Data for each partitioning key can be obtained from the partition 140a-140d that was trained by the reducer 130a-130d assigned that partitioning key during training of the acoustic model 140. The speech recognition system 150 uses the acoustic model data to assess the likelihood that the candidate transcription is correct. The speech recognition system 150 then provides to the computing device 160 one or more hypotheses 164 determined most likely to be correct transcription(s) of the audio data 162.

Figure 2:
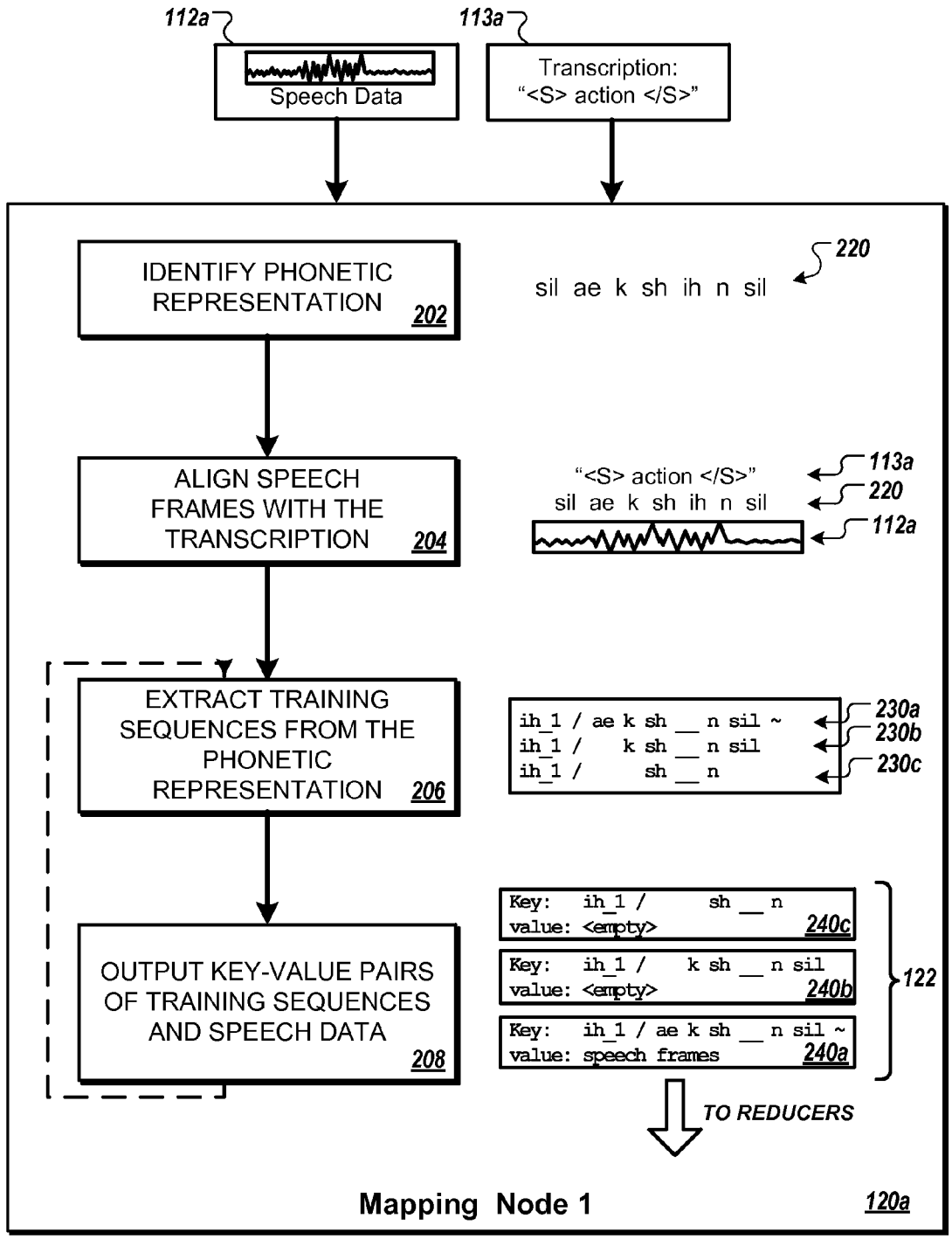
FIG. 2 is a diagram that illustrates an example of processing performed by a mapper processing module.

FIG. 2 is a schematic diagram that illustrates an example of processing performed by a mapper processing module. As an example, the mapper 120a of FIG. 1 is illustrated processing a particular input to generate one of the training datasets 122. Each of the mappers 120a-120d can perform similar processing with other input data to generate other datasets 122. Each mapper 120a-120d can perform processing on word-level segments of sample speech data, in the manner described below.

The mapper 120a of FIG. 1 accesses speech data 112a for particular utterance, such as a voice query submitted by a user. The mapper 120a also accesses data that identifies a transcription 113a for the speech data 112a, which in the illustrated example, indicates that the transcription 113a includes the term "action." In some implementations, the mapper 120a receives chunks of input data that each include multiple records. Each record can include the audio waveform for the utterance, the word-level transcription for the utterance, and other elements.

In some implementations, to avoid training the acoustic model 140 with erroneous data, the mapper 120a ensures that a minimum threshold confidence score for the transcription is met, which indicates that the transcription is likely to be correct. When a transcription does not meet the minimum confidence threshold, the transcription and associated data are not processed further, and the mapper proceeds to process other input data.

The mapper 120a identifies a phonetic representation 220 for the transcription 113a (202). From a pronunciation lexicon, the mapper 120 can obtain a mapping of the transcription 113a to a sequence of phonetic elements, such as context-independent (CI) phones, that represent a pronunciation of the transcription 113a. For example, for the word "<S>action</S>," the phonetic representation 220 "sil ae k sh ih n sil" is obtained. The symbols "<S>" and "</S>" denote sentence boundaries, which are pronounced as long silences, indicated as "sil" in the phonetic representation 220. In some implementations, the CI-phones can be augmented with word boundary symbols, which occupy their own positions in phonetic representations.

The mapper 120a aligns the phonetic representation 220 with the transcription 113a (204). For example, the mapper 120a generates context-dependent-state level Viterbi alignment between speech frames of the speech data 112a and the transcription 113a. The alignment can be obtained using H∘C∘L, where L, C, and H respectively denote the pronunciation lexicon, a context dependency tree, and HMM-to-state finite state transducers (FSTs). In some implementations, alignment involves identifying the speech frames that correspond to each context-dependent HMM state in the phonetic representation, where the context is the current phone and surrounding phones. Alignment can include determining the beginning and ending time indexes of audio data correspond to each HMM state of each phone.

The mapper 120a extracts training sequences 230a-230c from the phonetic representation 220 (206). Each training sequence 230a-230c is referred to as an M-phone, a modeling unit that identifies a sequence of phones. M denotes an integer number of contextual phones surrounding a central phone in the sequence. Each training sequence 230a-230c or M-phone describes a different contiguous segment of acoustic features corresponding to a context-dependent HMM state. Each training sequence 230a-230c can include different set of contextual phones from a contiguous portion of the phonetic representation 220.

M-phones having different values of M include different numbers of contextual phones extending to the left and right of a central phone from the phonetic representation 220. As an example, a $5^{th}$-order M-phone (e.g., a 5-phone) includes 5 phones preceding a central phone and 5 phones following the central phone, thus describing a sequence of 11 consecutive phones in the phonetic representation 220. As another example, a $3^{rd}$-order M-phone (e.g., a 3-phone) includes 3 phones preceding a central phone and 3 phones following the central phone, therefore describing a sequence of 7 phones. A $1^{st}$-order M-phone (or 1-phone) includes a total of three phones, and is therefore referred to as a "triphone" (which is different from a 3-phone, which is 7 phones in length). M-phones can be extracted for any integer value of M when the phonetic representation 220 is sufficiently long.

To extract a set of training sequences 230a-230c, the mapper 120a selects a central phone, which represents a central position that each training sequence 230a-230c is centered on. For the central phone, the mapper 120a extracts M-phones for values of M that range from 1 to a predetermined maximum value. The maximum value identifies the highest-order M-phone to be extracted. The maximum value of M can be, for example, 3, 4, 5, or 7, or another value of M. In some implementations, the maximum value of M can be consistent for all mappers 120a-120d and for all input data when generating the acoustic model 140.

The mapper 120a extracts the M-phone for the maximum value of M, and the mapper 120a also extracts "back-off" M-phones that each include fewer contextual phones. From the maximal order M-phone (e.g. the M-phone that includes the largest number of contextual phones), the mapper 120a extracts M-phones with lower values of M, until the $1^{st}$-order M-phone (the triphone) is extracted. For example, if the maximum value of M is 5, the back-off M-phones are the 4-phone, 3-phone, 2-phone, and 1-phone.

In the illustrated example, each training sequence 230a-230c is a different M-phone centered on the same central phone "ih." The mapper 120a uses "3" as a maximum value of M, indicating that a maximum of 3 contextual phones before and after the central phone, "ih," are to be used in generating the acoustic model 140. A total of 3 M-phones are extracted (e.g., M-phones for the set M={1, 2, 3}). The maximal order M-phone in the set—the M-phone that includes the most phones—is the training sequence 230a, the 3-phone. The training sequence 230b (the 2-phone) and the training sequence 230c (the 1-phone) are the back off M-phones in the set. Each training sequence 230a-230c includes a shared segment of the phonetic representation 230, the portion "sh_n," where "_" is a placeholder marking the position where the central phone "ih" is located. Each training sequence 230a-230c is a training data instance that corresponds to a portion of the speech data 112a, as described further below. A representation that uniquely identifies an M-phone is referred to as an M-phone key. The M-phone key can be a string representation of the training sequence 230a-230c or another format that identifies the training sequences 230a-230c.

In some implementations, multiple states or units are used to model each phone. For example, a phone can be modeled by three states in an HMM. The phone "ih" can be modeled by states "ih_1," "ih_2," and "ih_3," which represent characteristics of the beginning, middle, and end of the "ih" phone, respectively. Thus the training sequences can be used to model particular states within a phone, rather than the entire phone. While a set of training sequences 230a-230c corresponding to only the state "ih_1" is illustrated, the mapper 120a can extract similar sets of training sequences can be extracted for other states of the "ih" phone, and for states of other phones in the phonetic representation 220.

In some instances, the amount of phonetic context that surrounds a central phone may not be symmetrical. In such instances, the M-phones that are extracted may include asymmetrical amounts of context. For example, for the phonetic representation 220, there are 4 contextual phones before the phone "ih" and 2 contextual phones after the phone "ih." As a result, the training sequence 230a has a different number of contextual phones before and after the phone "ih," and represents a sequence of six phones rather than a sequence of 7 phones, which would be expected for a 3-phone. To extract training sequences, the mapper 120a can extract asymmetrical back-off M-phones by backing-off from only the longer end of an asymmetrical phonetic representation. When a symmetric amount of context is reached, the mapper 120a can proceed with symmetric back-offs. A symbol, such as "~" can be used in an asymmetrical M-phone to indicate a vacant contextual position for which no contextual phone is available.

The mapper 120a outputs key-value pairs 240a-240c that each identify one of the training sequences 230a-230c, and may include speech data (208). A key-value pair 240a-240c is generated and output for each of the training sequences 230a-230c. The training sequences 230a-230c (or other encoded representation of them them) serve as the keys in the key-value pairs 240a-240c. The values in the key-value pairs 240a-240c can be speech frames or other speech data, although the value may also be empty.

In some implementations, speech frames are only included in the key-value pair 240a for the training sequence 230a that includes the highest number of phones (e.g., the maximal order M-phone). To avoid sending an excessive amounts of data to the reducer, speech frames for the back-off M-phones are not included in the key-value pairs 240b, 240c. As a result, the data in the dataset 122 can include: (i) a key-value pair of <M-phone key, speech frames>, for the longest training sequence; and (ii) a key-value pair of <M-phone key, <empty>> for each of the back-off M-phones.

Although speech frames are not provided for individual back-off M-phones, the corresponding speech frames can be accessed as subsets of the speech frames provided for the maximal order M-phone. If speech frames were transmitted with each key-value pair 240a-240c, the speech frames would be replicated and transmitted M times, substantially increasing the bandwidth requirements for the system. By transmitting the speech frames with only one of the key-value pairs 240a-240c, and caching the speech frames at the reducer, the bandwidth requirements are reduced.

Various techniques can ensure that the reducer can access speech frames for each training sequence 230a-230c. During shuffling, each key-value pair 240a-240c is transmitted to the same reducer 130a-130d for processing. Each key-value pair 240a-240c is routed to the appropriate reducer 130a-130d (by the mapper 120a and/or other processing modules) based on a partitioning key. As discussed above, data associated with a given partitioning key can be processed by exactly one reducer 130a-130d. The partitioning key is a function of the central triphone, which is shared by each training sequence 230a-230c. Because each of the training sequences 230a-230c has the same central triphone, "sh ih n," the key-value pair 240a-240c for each training sequence 230a-230c is assigned the same partitioning key, and is thus received by the same reducer 130a-130c. All key-value pairs that include the same central triphone (e.g., "sh ih n") are handled by the same reducer 130a-130d, regardless of which mapper 120a-120d produced the key-value pair.

In the illustrated example, the partitioning key is a function of the central triphone. As an alternative, in some implementations, another partitioning key system is used. For example, the partitioning key can be determined based on the central phone, or based on a 2-phone, resulting in a different division of work among the reducers 130a-130d.

Because only one key-value pair 240a in the dataset 122 includes speech frames, the reducer that receives the key-value pairs 240a-240c caches the speech frames. As described further below, the reducer processes the key-value pairs 240a-240c in order from longest training sequence to shortest training sequence. Thus the key-value pair for any given M-phone is processed by the reducer before the key-value pairs for any of its back-off M-phones. The reducer can cache the speech frames for all of the back-off M-phones down to the central triphone.

In some implementations, to facilitate the ordering of the training sequences and caching of speech frames, each training sequence can be re-keyed before being output to the reducer. For example, the training sequence 230a, "ih_1/ae k sh_n sil~" can be keyed as "ih_1/ sh n k sil ae ~" to guarantee that data for the same central triphone is processed in order of longest context to shortest context at the reducer processing "partition (ih_1/sh_n)."

In addition to outputting the dataset 122 for "ih_1" (the first state of the phone "ih"), the mapper 120a can also extract training sequences and output key-value pairs that identify training sequences for "ih_2" and "ih_3," which are other states of the phone "ih." The mapper 120 can also generate datasets 122 with other phones in the phonetic representation 220 as the central phone. For example, datasets 122 can be generated with "ae," "k," "sh," and so on as central phones, respectively. In some implementations, the mapper 120a generates a dataset 122 for each state of each phone in the phonetic representation 220. The mapper 120a then proceeds to repeat the described operations for additional input data.

Figure 3:
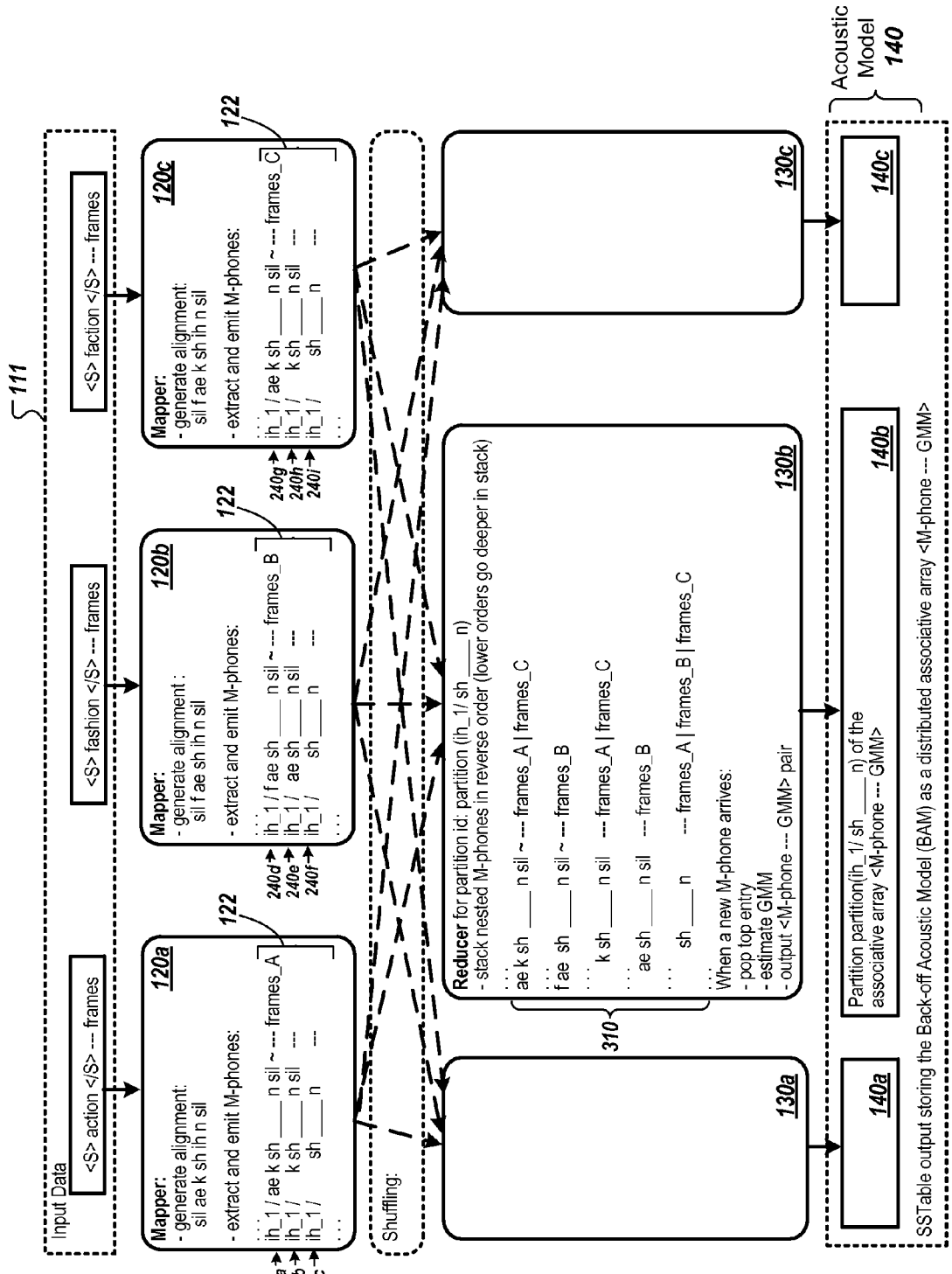
FIG. 3 is a diagram that illustrates an example of interactions between mapper processing modules and reducer processing modules of FIG. 1.

FIG. 3 is a diagram that illustrates an example of interactions between mapper processing modules 120a-120d and reducer processing modules 130a-130d of FIG. 1. The diagram also illustrates processing performed by the reducer processing modules in further detail. In the illustrated example, three mappers 120a-120c generate key-value pairs 240a-240i based on speech inputs "<S> action <S>," "<S> fashion <S>," and "<S> faction <S>," respectively. For purposes of example, the key-value pairs 240a-240i illustrated each identify a training sequence (e.g., an M-phone) centered on the same central phone, "ih_1." Each of the training sequences also includes the same central triphone sequence, identified by the M-phone key of "ih_1/sh_n."

The output of the mappers 120a-120c is distributed to the reducers 130a-130c during the shuffling phase of processing. Each of reducers 130a-130c is assigned a distinct set of partitioning keys. During shuffling, each reducer 130a-130c receives all of the training sequences with its set of partitioning keys. As described above, the partitioning key for a training sequence is determined using the central triphone within the training sequence. Because the training sequences all include the same central triphone, the training sequences are all transmitted to the same reducer.

In the illustrated example, the partitioning key "ih_1/sh_n" is assigned to the reducer 130b. All of the training sequences include the same central triphone, and therefore are associated with the same partitioning key "ih_1/sh_n." As a result, all of the training sequences are transmitted to the same reducer 130b during shuffling.

During shuffling, the key-value pairs identifying the training sequences can be transmitted to the reducers directly or indirectly through one or more other devices. In some implementations, a mapper may determine that a particular reducer, from a set of reducers, is assigned to process each training sequence. For example, the mapper or another processing device may access a table to determine which reducer is assigned to the partitioning key associated with a given key-value pair. Other methods of routing the key-value pairs to the appropriate reducers can be used.

In some implementations, one or more shuffler processing modules sort the stream of key-value pairs 240a-240i output by the mappers so that the key-value pairs 240a-240i arrive the reducers in a particular order, for example, in order from longest training sequence to shortest training sequence. For example, the key-value stream that arrives at a reducer can sorted so that the key-value pairs arrive at the reducer sorted in lexicographic order of the keys (e.g., the M-phone training sequences). The re-keying of the training sequences, described above, can facilitate this sorting, so that standard string sorting can be used to obtain the appropriate ordering. By sorting the key-value pairs 240a-240c in this manner, it can be guaranteed that the reducer processes the key-value pair for a maximal order M-phone, which includes speech frames, before processing the key-value pairs for the back-off M-phones, which do not include speech frames.

Each key-value pair can be independently directed to the appropriate reducer. For example, the partitioning key associated with a key-value pair can be identified from the key portion of the key-value pair, which identifies a particular training sequence or M-phone. A sequence from the key portion, such as the central triphone, can be used to determine the appropriate partitioning key for that key-value pair.

Reducers aggregate the data in the key-value pairs. In the illustrated example, the reducer 130b aggregates the data in the received key-value pairs 240a-240i, where each represents one instance of a training sequence. The reducer 130b can aggregate the data by adding training sequences to a stack 310. In the stack 310, the training sequences are positioned according to their length. For example, shorter training sequences, such as "sh_n," are placed lower in the stack than longer sequences, such as "ae k sh_n~."

When the reducer 130b receives a key-value pair for a maximal order M-phone (e.g., key-value pair 240a that includes speech frames), the reducer places it at the top of the stack 310. The key-value pairs for the back-off M-phones (e.g., the key value pairs 240b, 240c that do not include speech frames) arrive afterward, while the key-value pair for the maximal order M-phone is at the top of the stack 310. The back-off M-phones are placed below the maximal order M-phone in the stack 310, and reference the speech frames provided for the maximal order M-phone. As a result, the back-off M-phones are associated with corresponding speech frames in the stack 310, even though speech frames were not provided with the back-off M-phones individually.

Each entry in the stack 310 can represent a unique training sequence or phonetic context. In other words, data for different instances of the same training sequence can be accumulated and stored in a single entry in the stack 310. As the reducer 130a accumulates data from the mappers 120a-120d, multiple key-value pairs are received for the sequences of phones. In other words, data is received that represents instances of the same phonetic context occurring in different speech samples. As an example, the reducer 130b receives three key-value pairs 240c, 240f, 240i that identify the same training sequence, "sh_n." Each key-value pairs 240c, 240f, 240i, or instance of the training sequence "sh_n," corresponds to different speech frames, being subsets of the speech frames "frames_A," "frames_B," and "frames_C," respectively.

After shuffling, and after the data from the key-value pairs 240a-240i is aggregated in the stack 310, the reducer 130b uses the aggregate data to generate portions of the acoustic model 140. The reducer 130b removes the top entry from the stack, and estimates an acoustic model component for the M-phone. For example, the reducer 130b estimates a probability function based on the accumulated speech frames associated with an M-phone. The probability function may be a probability density function (PDF).

The probability function that the reducer 130 estimates may be a non-parametric model. The techniques for generating the model are generally similar to vector quantization with a very large codebook, where the probability of each codeword is assigned using an n-gram model. Techniques for generating a probability function for an M-phone based on the accumulated speech frames shown in FIGS. 4A-4C.

The probability functions that the reducers generate can be context-dependent, state-specific probability functions. For example, the probability function is dependent on the phonetic context (e.g., the sequence of contextual phones) in the training sequence, as the probability function is generated based on speech frames that each correspond to that phonetic context. The probability function generated for a given training sequence can model the output distribution of a particular HMM state of the central phone of the training sequence. The acoustic model 140 is a collection of data that indicates the context-dependent, state-specific probability function for each of various M-phones.

The output of the reducer 130b can be in the form of an array entry, <M-phone, Probability Function>, which can be stored in a distributed associative array. After estimating and storing the probability function for one M-phone, the reducer 130b then removes the next entry from the top of the stack 310 and estimates a probability function for the training sequence that this entry represents. The reducer 130b continues to generate acoustic model data based on each of the entries in the stack 310, with each entry representing a different phonetic context. The pairs of training sequences and probability functions are written to the distributed associative array. In some implementations, the distributed associative array is an immutable persistent B-tree, such as an SSTable.

As described above, each phone can be represented by multiple HMM states (e.g., "ih" can be represented by HMM states "ih_1," "ih_2," and "ih_3,"). In some implementations, each probability function stored in the acoustic model 140 can model the output distribution of a particular HMM state of a particular phone. The probability functions are conditioned on the identity of the HMM state (e.g., "ih_1") and also on the surrounding phonetic context (e.g., the contextual phones in an M-phone). Accordingly, each probability function is identified by surrounding phonetic context, identity of the central phone, and the particular HMM state of the central phone.

In some implementations, reducers only generate an entry (e.g., a <M-phone, probability function> component) in the acoustic model 140 when at least a minimum number of instances of the training sequence have been received. For example, the reducer 130b determines the number of sets of speech frames that have been accumulated for a training sequence. If the number of frames is greater than or equal to the minimum threshold, the reducer 130b produces a probability function for the training sequence and outputs the <M-phone, probability function> entry to the associative array. If the number of frames is less than the minimum threshold, the training sequence is omitted from the model. In this manner, training of the acoustic model 140 is avoided for training sequences that occur infrequently in the input data.

In some implementations, the reducers use a subset of the sets of speech frames for a given training sequence when the number of sets of speech frames exceeds a threshold. For example, when the number of instances of training data for a training sequence exceeds the threshold, the reducer can use reservoir sampling techniques to produce a probability function based on a proper subset of the training data instances.

To use the trained acoustic model 140, a system can look up the probability function for a particular phonetic context of interest. For a test sequence of phones, an appropriate partitioning key is determined based on the central triphone in the sample sequence. The partitioning key identifies the particular partition of the distributed array that stores the data for the test sequence (and for all other phonetic contexts that include the same central triphone). Within the identified partition of the distributed array, the sample sequence itself can act as a key used to look up the corresponding probability function for the test sequence, if one exists in the array.

In some implementations, as an alternative to or in addition to generating non-parametric models, reducers may generate parametric models as probability functions. In some implementations, the probability function is a Gaussian Mixture Model (GMM) (e.g., a linear combination of Gaussians) for the training sequence estimated using the speech frames corresponding to the training sequence. Each GMM can store, for example, the number of Gaussian components in the GMM, and weights for each of the components. Diagonal covariance Gaussians, full covariance Gaussians, or other representations can be used. In addition, each GMM can have a dimensionality equal to the dimensionality of the feature vectors used to train the model and/or recognize speech using the model. For example, if a 39-dimensional feature vector is used to describe speech characteristics, then a 39-dimensional GMM can be used to store data for each of the 39 feature dimensions.

In some implementations, the number of Gaussian components in a given GMM may be determined based on the number of speech frames aligned against a particular HMM state of a phone during training. For example, a GMM can be sized as a function of the number of frames, n, using a log-linear rule:

$$\log(\text{no. mix components}) = \log(\beta) + \alpha \cdot \log(n),$$

where $\beta$ and $\alpha$ are empirically derived constants, selected to set an appropriate number of Gaussian mixture components in a GMM. $\beta$ can represent a default number of mixture components and $\alpha$ can control the degree to which additional mixture components are included. Typically, $\alpha$ has a value of less than one. Using the training techniques described herein, large numbers of Gaussian mixture components can be used to model a given HMM state and phonetic context. In some implementations, 50, 100, 500, or 1000 or more Gaussian mixture components can be included in a context-dependent GMM that models an HMM state.

Figure 4A:
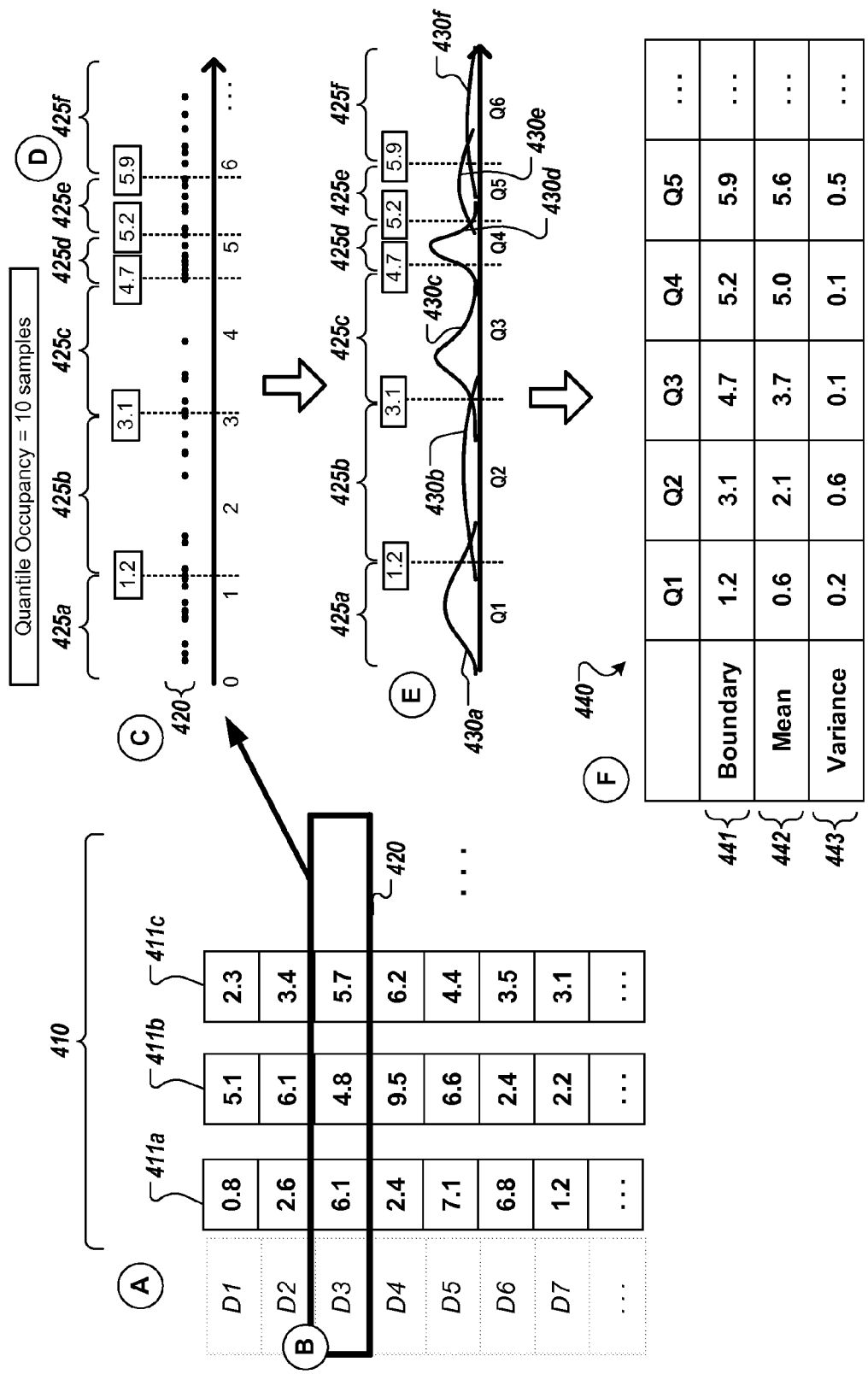
FIGS. 4A-4C are diagrams that illustrate an example of generating a non-parametric probability function.
Figure 4B:
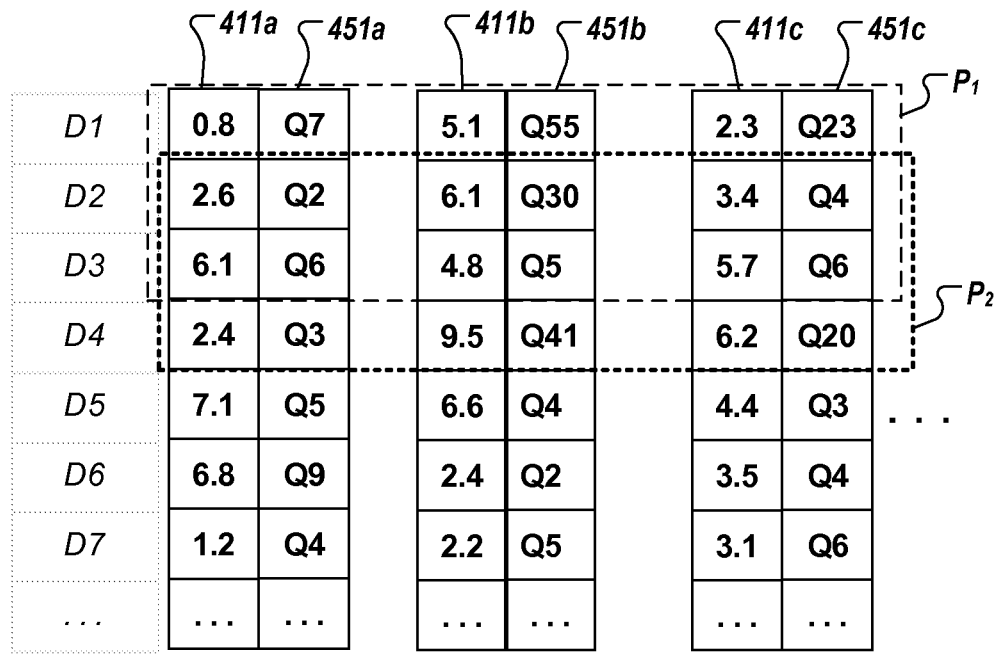
Figure 4C:
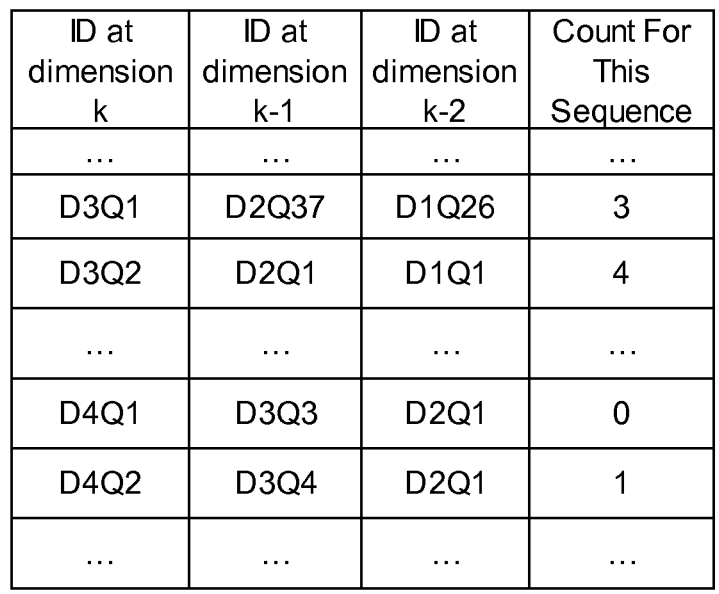

FIGS. 4A-4C are diagrams that illustrate an example of generating a non-parametric model. The processing is described as being performed by the reducer 130b, but may alternatively be performed by another processing module or computing system. The techniques shown in FIGS. 4A-4C and described below can be used to estimate a multidimensional model indicates probabilities that a speech frame occurring in a specific phonetic context corresponds to a particular HMM state of a phone. For example, the model can be a non-parametric probability density function (PDF).

Briefly, as shown in FIG. 4A, the reducer 130b divides each of several speech aspects or dimensions of the speech frames into ranges referred to as quantiles, and models the training data in each quantile with a probability function. As shown in FIGS. 4B and 4C, the reducer 130b uses n-gram modeling to create a multidimensional probability function for an M-phone, involving conditional probabilities across multiple dimensions. Together, the probability functions for the quantiles and the multidimensional probability function form the non-parametric model for an M-phone.

Referring to FIG. 4A, the diagram shows stages (A) to (F), which illustrate a flow of data, and which may occur in the sequence illustrated or in a different sequence. The reducer 130b has received a collection of training data that corresponds to the M-phone to be modeled (e.g., training data corresponding to the same HMM state of a central phone and the same phonetic context). For example, the reducer 130b has received the speech frames accumulated for the M-phone in the reducer's stack after a shuffling phase of map-reduce processing.

In stage (A), the reducer 130b identifies, from the training data for the M-phone, a collection 410 of speech frames 411a-411c corresponding to the HMM state being modeled. The collection 410 of speech frames include only speech frames that (i) correspond to the same HMM state of the same central phone in the M-phone, and (ii) occur in the same phonetic context. In the illustrated example, each of the speech frames 411a-411c represents the "sh_1" state occurring in the phonetic context of "ae k sh_n sil~." The collection 410 includes only the frames corresponding to the "sh_1" state. The collection 410 excludes speech frames for the "sh_2" and "sh_3" states and also excludes speech frames corresponding to the contextual phones surrounding the "sh_1" state.

Each of the speech frames 411a-411c is a D-dimensional vector. The dimensions are referred to as D1, D2, D3, and so on. Each dimension represents a different aspect of speech or measurement criterion for speech. Each of the speech frames has a value for each dimension. In creating the non-parametric model for a given M-phone, it is assumed that the speech frame values for the different dimensions are independent. As a result, each dimension can be modeled independently. Modeling of the data for each dimension proceeds under this independence assumption.

In the illustrated example, a single speech frame 411a-411c corresponds to the HMM state "sh_1," and each speech frame represents a portion of a different utterance. In some implementations, multiple speech frames may correspond to a single HMM state in an utterance. For example, the HMM state of a vowel may be sufficiently long that corresponding audio extends across multiple 10 ms speech frames. In these instances, a set of multiple speech frames, including all speech frames that correspond to the HMM state for a particular utterance, can be included in the collection 410.

The collection 410 of speech frames 411a-411c can be expressed as a set of training data consisting of some number S of samples for D-dimension independent and identically distributed (i.i.d.) random variables:

$$y_s \in \mathcal{R}^D, s=0 \ldots S-1.$$

A threshold T is set to define the minimum number of data points needed for reliable estimation of a univariate Gaussian distribution.

In stage (B), the reducer 130b accesses speech frame values for one of the dimensions. For example, to model the dimension D3, a set 420 of speech frame values for dimension D3 are selected from the speech frames 411a-411c in the collection 410. The speech frame values are referred to below as "samples." Each sample is a different data point along a dimension.

In some implementations, the reducer 130b compares the number of speech frames 411a-411c to one or more thresholds. If the number of speech frames 411a-411c exceeds a maximum number, the reducer 130b limits the number of samples in the set 420. For example, the reducer 130b samples from the collection 410 to select a proper subset (e.g., fewer than all) of the speech frames 411a-411c that includes the maximum number of speech frames or fewer. The samples in the set 420 are then taken from the speech frames in the proper subset. If the number of speech frames in the collection 410 is less than a maximum number (and also above a minimum number), the reducer 130b includes all of the speech frame values for the dimension D3 in the set 420. If the number of speech frames in the collection 410 is less than a minimum threshold, the reducer 130b can determine that there is insufficient training data and in response may not generate a model for the M-phone.

In stage (C), the reducer 130b orders the values in the set 420. For example, the values may be sorted in ascending order, descending order, or in another manner.

In stage (D), the reducer 130b designates quantiles 425a-425e or value ranges along the dimension D3 based on the samples in the set 420. The quantiles 425a-425e are equal occupancy quantiles, each including a fixed, predetermined number of samples. The reducer 130b selects the boundary values for the quantiles 425a-425e to such that the same number of samples are included in each of the quantiles 425a-425e.

For a given M-phone, the number of quantiles is based on the number of speech frames 411a-411c (e.g., the amount of training data) corresponding to the M-phone. Accordingly, the number of quantiles will vary from one M-phone to another. The number of quantiles used when modeling an M-phone is based on the set of training data used, and thus is not predetermined. Generally, the more training data that is available for an M-phone, the more quantiles are used when generating the non-parametric model for the M-phone.

For a specific M-phone, the various speech frame dimensions are typically divided into the same number of quantiles, because each speech frame 411a-411c includes a value for each of the D dimensions. In the illustrated example, each dimension D1, D2, D3, etc. is divided into quantiles based on the same speech frames 411a-411c, and thus each dimension D1, D2, D3, etc. has the same number of quantiles.

The number of samples in each quantile 425a-425e can be a predetermined occupancy number, such as, for example, 100, 200, 300, etc. In some implementations, the same occupancy number is used for modeling each dimension and for modeling each M-phone. The occupancy number can be a number set to a value equal to or above a minimum threshold for reliably estimating a Gaussian probability density function. As a result, a Gaussian distribution may be estimated for each quantile 425a-425e to model the distribution of the samples within the quantile 425a-425e, as described below.

Because the number of samples in the set 420 may not be an exact multiple of the occupancy number, one or more quantiles, such as the highest quantile or lowest quantile, may include a number of samples that is less than the occupancy number. In FIG. 4A, an upper quantile 425f includes the remainder of the samples that totals less than the occupancy number.

To set the quantile boundaries, the reducer 130b counts through the samples in the set 420, in order, up to the occupancy number. When the count reaches the occupancy number, the reducer 130b defines a quantile boundary at the value of the current sample, resets the count, and continues counting through the rest of the samples. This continues until the number of samples that remain is less than the occupancy number. If the reducer 130b counts the samples in ascending order, the reducer 130b sets upper quantile boundaries. If the reducer 130b counts the samples in descending order, the reducer 130b sets lower quantile boundaries. In either instance, the regions between the boundaries are defined as quantiles.

In the illustrated example, the occupancy number is ten. The boundaries of the quantiles are defined so that each of the quantiles 425a-425e includes ten samples from the set 420, and the remainder of the samples are included in the quantile 425f. The reducer 130b traverses the ordered samples in the set 420 from smallest to largest value, defining an upper quantile boundary at the tenth sample, the twentieth sample, the thirtieth sample, and so on, until fewer than ten samples remain.

In general, the number of quantiles that are defined varies according to the set of data used to train the acoustic model. An M-phone will have more or fewer speech frames 411a-411c, and thus more or fewer samples in the set 420, depending on the frequency that the M-phone occurs in the training data.

In some implementations, the quantiles are defined so that each of the quantiles represents a non-overlapping range of values. As a result, any given value falls within only a single quantile. In addition, in some implementations, the quantiles, taken together, cover the entire range of potential values for a dimension. As a result, every value has a corresponding quantile. Each dimension has a different set of quantiles, determined based on the data samples for that dimension. This means that the quantile Q1 for dimension D1 generally spans a range of values different from the quantile Q1 of dimension D2.

Each of the quantiles 425a-425f can have an identifier. In some implementations, the identifier for a quantile 425a-425f is an index value assigned based on the position of the quantile in the set of quantiles 425a-425f. For example, each quantile 425a-425f can have an identifier from 0 to N-1, where N is the total number of quantiles defined for the dimension. In the illustrated example, the quantiles of dimension D3 that are shown are assigned identifiers Q1-Q6, in order from lowest range of values to highest range of values.

In some implementations, as noted above, probability functions are generated and included in the acoustic model 140 only for M-phones that have at least a minimum number of corresponding speech frames. Model components are not generated for M-phones for which the number of speech frames is less than the minimum threshold. As an example, the minimum may be approximately 4,000 speech frames. Given an occupancy number of 256 samples per quantile, when there are at least 4,000 speech frames, each dimension will be divided into at least 16 quantiles. An upper limit or cap may also be set on the maximum number of frames used per M-phone. In this example, the maximum number may be approximately 256,000 frames, which would permit a maximum of about 1,000 quantiles. When the number of speech frames corresponding to an M-phone exceeds the maximum number, sampling techniques are used to generate the probability function using fewer than all of the speech frames.

The designation of quantiles can be expressed as follows. For each dimension d=0 . . . D-1, equal occupancy quantiles Q are computed. Each equal occupancy quantile is an interval containing T samples, and the equal occupancy quantiles together span the rank-ordered S samples for that dimension. The span of each quantile can be expressed as:

$$Q_{d,i}=[\min(d, i), \max(d, i)),$$

where
d=0 . . . D-1, i=0 . . . ceiling(S/T)-1, min(d, 0)=-∞, max(d, ceiling(S/T)-1)=+∞.

In stage (E), the reducer 130b estimates a Gaussian distribution 430a-430f for each of the quantiles 425a-425f, based on the samples within the quantile 425a-425f. Each Gaussian distribution 430a-430f is a univariate Gaussian that models the set of samples included in the corresponding quantile 425a-425f. For a given quantiles $Q_{d,i}$, the corresponding Gaussian distribution is expressed as $\mathcal{N}(Q_{d,i})$. The Gaussian distribution for a quantile assigns a probability to every point within the quantile. Given that a value is somewhere within in the range spanned by a quantile, the Gaussian distribution for the quantile indicates the probability that the value occurs at specific position within the quantile.

In some implementations, the boundaries for the quantiles are determined using alternative techniques. For example, rather than setting the boundary at the value of the last sample of a given quantile, the boundary may be set at the mean between the last sample in a quantile and the first quantile in the next quantile. This technique places the boundary midway between the two adjacent samples. As another example, the boundaries for the quantiles may be set at the intersection of neighboring Gaussian distributions 430a-430f. After sets of samples corresponding to different quantiles are identified, and the Gaussian distributions 430a-430f are estimated, the reducer 130a may determine where Gaussian distributions 430a-430f for adjacent quantiles intersect. The values corresponding to the intersections are then set as the quantile boundaries.

In stage (F), the reducer 130b stores data regarding the quantiles 425a-425f and the corresponding Gaussian distributions 430a-430f. For example, for each quantile 425a-425f, the reducer 130b stores (i) data indicating one or more quantile boundaries, (ii) the mean of the corresponding Gaussian distribution 430a-430f, and (iii) the variance of the corresponding Gaussian distribution 430a-430f. To indicate the boundaries of the quantiles 425a-425f, a single boundary may be stored for each quantile 425a-425f. For example, only the upper boundary, or only the lower boundary, of each quantile 425a-425f may be stored. These single boundaries collectively define the range of values spanned by the respective quantiles 425a-425f.

In the illustrated example, a table 440 illustrates examples of data stored for the dimension D3. The table 440 indicates the upper boundaries 441 of the quantiles, and the mean values 442 and variances 443 of the Gaussians that model the data in the respective quantiles 425a-425f.

The reducer 130b performs the actions of stages (B) through (F) of FIG. 4A for each of the dimensions of the speech frames 411a-411c. While only the processing for the dimension D3 is illustrated, the same techniques are used to define quantiles for the rest of the dimensions (e.g., D4, D5, D6, etc.), and also to estimate Gaussian distributions for each of the quantiles of those dimensions. The reducer 130b stores data indicating, for each dimension, the boundaries of the quantiles for the dimension, as well as the mean and variance of the Gaussian that models each of the quantiles. Processing to generate the model continues as described below.

Referring to FIG. 4B, after designating the quantiles for each of the dimensions, the reducer 130b assigns each value (e.g., vector component) of the speech frames 411a-411c in the collection 410 to one of the quantiles in its corresponding dimension. For example, the reducer 130b determines which quantile corresponds to each value. The quantile corresponding to a value is the quantile that includes the value (e.g., the quantile that spans a range including the value). For example, for a value of three, a quantile that spans a range from one to five would include the value and would be the corresponding quantile. For each value of in the speech frames 411a-411c, the reducer 130*b* assigns the quantile identifier of the corresponding quantile. The assigned quantile identifiers are illustrated as vectors 451*a*-451*c* and referred to as quantile identification vectors below. Each vector 451*a*-451*c* indicates the quantiles corresponding to the values of a speech frame 411*a*-411*c*.

For each dimension, the quantile identifiers (e.g., Q1, Q2, Q3, etc.) refer to the particular set of quantiles defined for that dimension. A quantile identifier Q1 assigned for dimension D1 (e.g., D1Q1) refers to a quantile different from a quantile identifier Q1 assigned for dimension D2 (e.g., D2Q1).

In the illustrated example, for the speech frame 411*a*, the reducer 130*b* determines that the value "0.8" for dimension D1 is within the range of values corresponding to the quantile Q7 of dimension D1 (e.g., D1Q7). Also for the speech frame 411 a, the reducer 130*b* determines that the value "2.6" for dimension D2 is within the range of values corresponding to the quantile Q2 of the dimension D2 (e.g., D2Q7). The reducer 130*b* continues assigning quantile identifiers to the rest of the values in the speech frame 411*a*, as well as to the values of each of the other speech frames 411*b*, 411*c*.

To determine the corresponding quantile for each value, the reducer 130*b* compares values with the stored boundaries of the corresponding dimension. For example, where upper boundaries of the quantiles are stored, the reducer 130*b* compares a value to the upper boundaries, in order from smallest to largest. The first upper boundary that exceeds the value is the upper boundary for the corresponding quantile. As an alternative, when lower boundaries are stored, the reducer 130*b* compares values to the lower boundaries from largest to smallest values. The first lower bound that is less than the value is the lower boundary for the corresponding quantile.

The assignment of speech frame values to quantiles can be expressed as follows. Each vector component $y_d = y(d)$ is assigned to a given quantile where $i(y_d) = \arg_{i=0 \ldots ceiling(N/T)-1} y_d \in Q_{d,i}$, or equivalently, $\min(d, i(y_d)) \leq y_d < \max(d, i(y_d))$.

The reducer 130*b* then generates a probability function that can assign a probability to a sequence of quantile identifiers. This function is referred to as a multidimensional probability function. In some implementations, the reducer 130*b* uses n-gram modeling to estimate the probability function in terms of multiple dimensions. In the model, each n-gram is a sequence of quantile identifiers. The probability of occurrence of an entire vector of quantile identifiers (e.g., a sequence that includes a quantile identifier for all of the dimensions) is approximated as the product of conditional probabilities for each dimension. Independence assumptions are made so that the conditional probability for each dimension depends on values in fewer than all of the other dimensions. Although n-gram modeling is used in the example described below, other language models and probability distributions may alternatively be used.

The n-gram model generated by the reducer 130*b* may be expressed as follows. The model assigns a probability to a quantile identifier vector Q(y), which represents a sequence of quantile identifiers. The quantile identifier vector has one quantile identifier for each of the D dimensions, shown here indexed from 0 to D−1:

$$Q(y) = [Q_{0,i(y_0)} \ldots Q_{D-1,i(y_{D-1})}].$$

The probability of occurrence of this quantile identifier vector Q(y) is expressed as:

$$P(Q(y)) = \prod_{k=0}^{D-1} P(Q_{k,i(y_k)} | Q_{k-N+1,i(y_{k-N+1})} \ldots Q_{k-1,i(y_{k-1})}).$$

The probability function P(Q(y)) represents the probability of occurrence of the quantile identifier vector as a whole. The probability of occurrence of the quantile identifier vector is approximated as the product of conditional probabilities, according to n-gram modeling techniques. The probability of occurrence of a speech frame that includes values that correspond to a particular sequence of quantiles is a product of probabilities of occurrence of those quantiles, conditioned on the occurrence of one or more quantile identifiers for other dimensions.

Since the probability function P(Q(y)) depends on conditional probabilities, the reducer 130*b* determines the conditional probabilities that permit the overall probability for a given sequence of quantile identifiers to be computed. Various techniques may be used to determine the conditional probabilities. In some implementations, the reducer 130*b* counts a number of times that various combinations or sequences of quantile identifiers occur in the vectors 451*a*-451*c*. The counts are then used to determine the conditional probabilities. The sequences of quantile identifiers that are counted are depend on the order N of the n-gram model (e.g., N=2 for a bigram model, N=3 for a trigram model, etc.) and a defined sequence of traversal through the dimensions.

In the illustrated example, a trigram model is used, so N=3. Each trigram is a sequence of three quantile identifiers. The context length of an n-gram model is N−1, so the conditional probabilities used are each conditioned on N−1 other dimensions. For example, in the trigram model, the probability for a value in one dimension is conditioned on values in two other dimensions. In some implementations, probabilities are alternatively conditioned on values in fewer than two dimensions or more than two dimensions.

In the illustrated example, the reducer 130*b* traverses the dimensions in some predetermined sequence. The sequence of traversal indicates, for example, which two dimensions the probability is conditioned on. In this example, a linear sequence is used, so the probability for a value in one dimension is conditioned on the values in the preceding two dimensions. For example, the probability of occurrence of a quantile identifier for dimension D3 is conditioned on the values in dimensions D2 and D1.

This relationship may be visualized as a sliding window, sized to include values for three dimensions, where the sliding window moves down the vectors 451*a*-451*c*. The reducer 130*b* observes the combinations of the quantile identifiers, and counts the number of times each set of quantile identifiers occur together.

With the sliding window at a first position $P_1$, the sliding window includes the quantile identifiers for dimensions D3, D2, and D1. At position $P_1$, for the vector 451*a*, the reducer 130*b* observes the co-occurrence of quantile identifier Q6 of dimension D3, quantile identifier Q2 of dimension D2, and quantile identifier Q7 of dimension D1. The reducer 130*b* increments the count for this sequence of quantile identifiers (e.g., the sequence of D3Q6, D2Q2, and D1Q7).

At position P2, the sliding window includes the quantile identifiers for dimensions D4, D3, and D2. At position $P_2$, for the vector 451 a, the reducer 130*b* observes the co-occurrence of quantile identifier Q3 of dimension D4, quantile identifier Q6 of dimension D3, and quantile identifier Q2 of dimension D2. The reducer 130*b* increments the count for this sequence of quantile identifiers (e.g., the sequence of D4Q3, D3Q6, and D2Q2). The reducer 130*a* continues to move the sliding window along the vector 451*a* and increment counts corresponding to the observed sequences of quantile identifiers. The reducer 130*a* counts the number of times each sequence of quantile identifiers occurs in the set of vectors 451*a*-451*c*.

Referring to FIG. 4C, the reducer 130a determines the counts for all of the various combinations or sequences of quantile identifiers observed in the vectors 451a-451c. Examples of counts are shown in a table 480. With this these counts, the reducer 130a can determine, for example, the number of times that a given quantile identifier occurs in the context of any combination of quantile identifiers in the preceding two dimensions. The counts for the various combinations of quantile identifiers can be stored and used to build a conditional model.

In some implementations, the reducer 130b limits the amount of storage required to generate the model by storing only counts for sequences of quantile identifiers that meet a minimum threshold. For example, counts may be stored only for n-grams that occur two or more times in the vectors 451a-451c. During a typical training process, many n-grams (e.g., distinct quantile identifier combinations) are observed only once. Not storing counts below a threshold (and not storing probabilities corresponding to those counts) can reduce storage requirements substantially without significantly decreasing the discriminatory power of the model.

The counts are part of the data used to build a conditional model. For example, the counts are used to determine conditional probability values that are stored as part of the model. As an example, a fraction can represent the probability that a particular quantile identifier occurs, such as D3Q1, given a particular context, such as D2Q1 and D1Q1. The numerator is the count representing the number of times the sequence was observed in the training data (e.g., in the vectors 451a-451c). The denominator is the total number of times the contextual portion of the sequence (e.g., D2Q1 and D1Q1) occurred, regardless of the value in the dimension D3. Similar conditional probabilities are determined for each sequence of quantile identifiers, or in some implementations, for only sequences for which the count exceeds a minimum threshold.

In some implementations, one or more back-off conditional models are also generated. For example, in addition to generating a trigram model, back-off n-gram models, such as a bigram model and a unigram model, may also be generated. Where the trigram model conditions probabilities on values in two other dimensions, the bigram model conditions probabilities on values in only one other dimension, and the unigram does not condition the probabilities on values in any other dimensions. Counts can be determined for the number of times each unigram, bigram, and trigram sequence of quantile identifiers occurs in the vectors 451a-451c, as well as the number of times each 2-dimension, 1-dimension, and 0-dimension context occurs. The counts can then be used to determine conditional probabilities, or stored for later use. In some implementations, discounting and smoothing techniques are used with the n-gram models.

As an example, consider a sequence of quantile identifiers $\{B_1, B_2, B_3\}$, where each of the quantile identifiers $B_1, B_2, B_3$ occurs in a different dimension. The reducer 130b counts how often this sequence and various sub-sequences occur in the vectors 451a-451c. For this sequence, the reducer 130b determines a trigram count, expressed as $\#(B_1, B_2, B_3)$, that is the number of times the sequence $\{B_1, B_2, B_3\}$ occurs. The reducer 130b also determines a trigram context count, expressed as $\#(B_1, B_2, *)$, indicating a number of occurrences of values $B_1$ and $B_2$ together, regardless of the value in the dimension that includes $B_3$. The reducer 130b also determines a bigram count, $\#(B_2, B_3)$, of the number of times the sub-sequence $\{B_2, B_3\}$ occurs, as well as a bigram context count, expressed as $\#(B_2, *)$. The count for the bigram context is the total number of times the value $B_2$ occurs. Finally, the reducer 130b determines a unigram count, $\#(B_3)$, of a number of times the value $B_3$ occurs, regardless of context in any other dimension. The unigram context count is $\#(*)$, or the total number of the number of vectors 451a-451c (e.g., the total number of samples in the dimension that includes $B_3$, regardless of the values of the samples).

These counts can be used to determine various probabilities for the occurrence of quantile identifier $B_3$, conditioned on different amounts of context in other dimensions. For example, the probability of $B_3$ given $B_1$ and $B_2$, or $P(B_3|B_1, B_2)$, can be determined as the trigram count divided by the trigram context count: $\#(B_1, B_2, B_3)/\#(B_1, B_2, *)$. The probability of $B_3$ given $B_2$, or $P(B_3|B_2)$, can be determined as the bigram count divided by the bigram context count: $\#(B_2, B_3)/\#(B_2, *)$. The probability of $B_3$ without taking into account context, or $P(B_3)$, can be determined as the unigram count divided by the unigram context count: $\#(B_3)/\#(*)$. The reducer 130b stores the various n-gram counts and n-gram context counts and/or probabilities derived from these counts. The present example describes counts and probabilities for a single sequence, $\{B_1, B_2, B_3\}$. When generating the n-gram models, the reducer 130b may determine the counts and/or probabilities for each of the unique n-grams (e.g., sequences of quantile identifiers) observed in the vectors 451a-451c) in the same manner.

The conditional probabilities (and/or n-gram counts and context counts) for the n-gram model complete the model for the probability distribution for an M-phone, which in the example, is "sh_1: ae k sh_n sil~." When the acoustic model 140 is used to evaluate speech, the conditional probabilities that permit the overall probability $P(Q(y))$ to be determined for an entire vector of quantile identifiers that spans all of the dimensions. With the various dimensions linked in the conditional model, the sequence of quantile identifiers becomes a categorical variable.

The non-parametric model for an M-phone is fully described by (i) the conditional probabilities derived using the counts for the various combinations of quantile identifiers (e.g., the counts shown in the table 480), (ii) the quantile boundaries for each dimension, and (iii) the mean and variance of the univariate Gaussian distributions estimated for the quantiles. The reducer 130b outputs this information as the model or probability function associated with the M-phone. The data is stored as the component of the acoustic model 140 corresponding to the M-phone. In some implementations, the counts shown in the table 480 are also stored as part of the acoustic model 140. Similar probability functions are estimated and stored by the various reducers for all of the other M-phones, in the same manner described with respect to FIGS. 4A-4C.

In some implementations, the number of n-grams stored by the model and the identities of the particular n-grams are determined strictly by the training data. That is, the sequences of quantiles for which conditional probabilities are determined and stored depends on which sequences of quantiles observed in the training data and the frequency with which they are observed. The number of n-grams that have counts or conditional probabilities stored in the model typically increases as the amount of training data used increases, and as the diversity of n-grams encountered in the training data increases.

In some implementations, the conditional probabilities used to generate the multidimensional probability function are conditioned on values in dimensions other than immediately preceding dimensions. For example, rather than conditioning the probabilities in the n-gram model on preceding dimensions or dimensions in a linear order, the probabilities may be conditioned on another sequence or another set of dimensions. For example, any two other dimensions may be used. The dimensions upon which probabilities are conditioned may be selected to take into account dependencies in the data. For example, the reducer 130b or another system may determine that values in dimension D3 are best described by values for dimension D10 and dimension D25. Thus the conditional probability of occurrence of values in dimension D3 may be conditioned on values in dimension D10 and dimension D25, rather than dimensions D2 and D1 as described above.

In some implementations, data indicating the sequence of dimensions on which probabilities are conditioned is represented by a binary tree. The order of traversal specified by the binary tree, rather than a sliding window, is used to determine counts and conditional probabilities. The binary tree is always right branching or left branching. For example, the binary tree may indicate a sequence of {D5, D8, D22, D7, D4, . . . }. In this order of traversing the dimensions, the probability for dimension D22 is conditioned on values in dimensions D8 and D5, the probability for dimension D7 is conditioned on values in dimensions D22 and D8, and so on. The sequence indicated by the binary tree may be determined based on correlations among the values in different dimensions across a set of training data.

Figure 5:
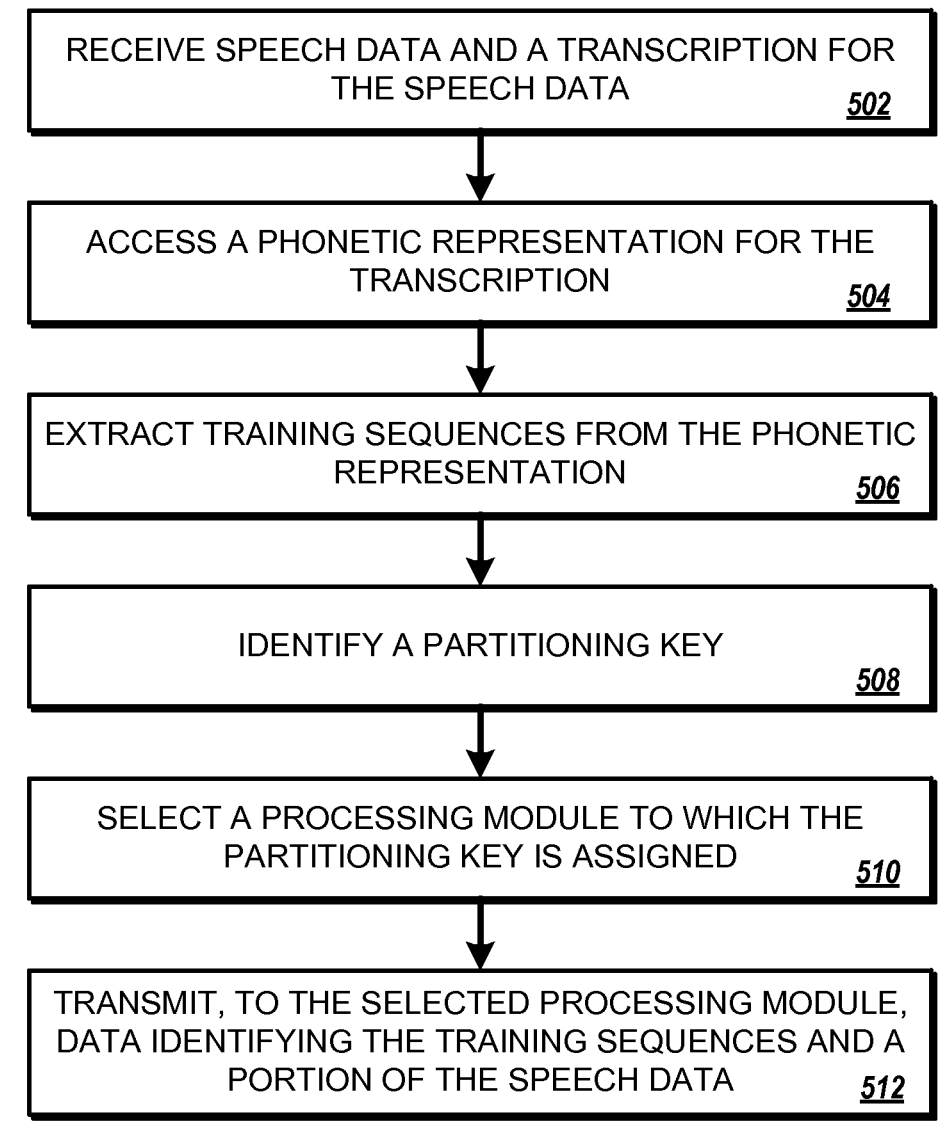
FIG. 5 is a flow diagram that illustrates an example of a process for training an acoustic model.

FIG. 5 is a flow diagram that illustrates an example of a process 500 for training an acoustic model. Briefly, speech data and a transcription for the speech data are received. A phonetic representation for the transcription is accessed. Training sequences are extracted from the phonetic representation. A partitioning key is identified. A processing module to which the partitioning key is assigned is selected. Data identifying the training sequences and a portion of the speech data is transmitted to the selected processing module.

In further detail, speech data and a transcription for the speech data are received (502). The speech data can include feature vectors that indicate speech characteristics. A feature vector can be received for each of multiple speech frames, where each speech frame represents, for example, 10 milliseconds of speech. The speech data and the transcription can be received at a mapper processing module.

A phonetic representation for the transcription is accessed (504). The phonetic representation can be a sequence of context-independent phones.

Training sequences are extracted from the phonetic representation (506). The training sequences are extracted for a particular phone in the phonetic representation. For example, the particular phone can be a central phone in each of the training sequences. Each of the training sequences can include a different set of contextual phones surrounding the particular phone. For example, each of the training sequences can be an M-phone, with a different integer value of M, as described above. The extracted sequences can include at least, for example, a first sequence that includes one contextual phone before the particular phone and one contextual phone after the particular phone, a second sequence that includes two contextual phones before the particular phone and two contextual phones after the particular phone, and a third sequence that includes three contextual phones before the particular phone and three contextual phones after the particular phone. Each of the training sequences can be sequences of consecutive phones in the phonetic representation.

A partitioning key is identified based on a sequence of phones that occurs in each of the training sequences (508). The partitioning key can be identified based on a sequence of two or more consecutive phones that occurs in each of the training sequences. The partitioning key can be based on a sequence that includes at least one contextual phone before the particular phone and at least one contextual phone after the particular phone. The sequence of phones used to identify the partitioning key can be the central triphone, which can be shared by all of the training sequences. In some implementations, a partitioning key is identified for each of the training sequences, and the same partitioning key is identified for each of the training sequences.

A processing module, to which the identified partitioning key is assigned, is selected from among a plurality of processing modules (510). The selected processing module is designated to train a portion of an acoustic model that corresponds to the identified partitioning key.

Data identifying the training sequences and a portion of the speech data are transmitted to the selected processing module (512). The data can be transmitted to the selected processing module and not transmitted to any other processing module assigned to generate a portion of the acoustic model. The portion of the speech data that is transmitted can be a portion that corresponds to the training sequence that includes the most contextual phones.

To transmit the portion of the speech data, an instance of speech data can be transmitted for fewer than all of the training sequences. The portion of speech data that is transmitted can be speech data corresponding to the training sequence that includes the most contextual phones. In some implementations, additional instances of speech data are not transmitted for the other training sequences. In other words, speech data can be transmitted with only the longest training sequence of the training sequences.

The process 500 can include receiving, at the selected processing module, the data identifying the training sequences and the portion of the speech data that corresponds to the training sequence that includes the most contextual phones. At the selected processing module, a different subset of the received speech data can be accessed for each of the training sequences.

In some implementations, the training sequences are first training sequences that each include the same central triphone. The partitioning key is identified based on the central triphone included in the first training sequences. Second training sequences that include the central triphone can also be extracted from a second phonetic representation for second speech data. Data identifying the second training sequences can be transmitted to the same processing module to which the data identifying the first training sequences is transmitted. For example, a partitioning key can be identified for one or more of the second training sequences based on the central triphone, and the partitioning key can be the same partitioning key identified for the first training sequences.

In some implementations, the process 400 includes receiving, at the selected processing module, the data identifying the training sequences and the portion of the speech data. At the selected processing module, speech data for the training sequences can be aggregated with speech data for other instances of the training sequences. A model for a first training sequence of the training sequences can be generated based on the aggregated speech data for the first training sequence. The model can be a non-parametric model. For example, the model can be a non-parametric model dependent on the sequence of contextual phones included in the first training sequence, where the non-parametric model models the output distribution of a HMM state of a central phone of the first training sequence.

The generated model can be stored in a distributed associative array. For example, the generated model can be stored in a partition of the distributed associative array that is associated with the identified partitioning key. The generated model can be stored in the distributed associative array in association with a key that uniquely corresponds to the first training sequence. For example, the key can be associated with the model for the first training sequence, and in the distributed associative array the key is not associated with any model for any other training sequence.

In some implementations, the selected processing module determines that the aggregated speech data includes data for fewer than a threshold number of instances of a second training sequence of the training sequences. In response to the determination, the selected processing module does not generate a model for the second training sequence.

Figure 6:
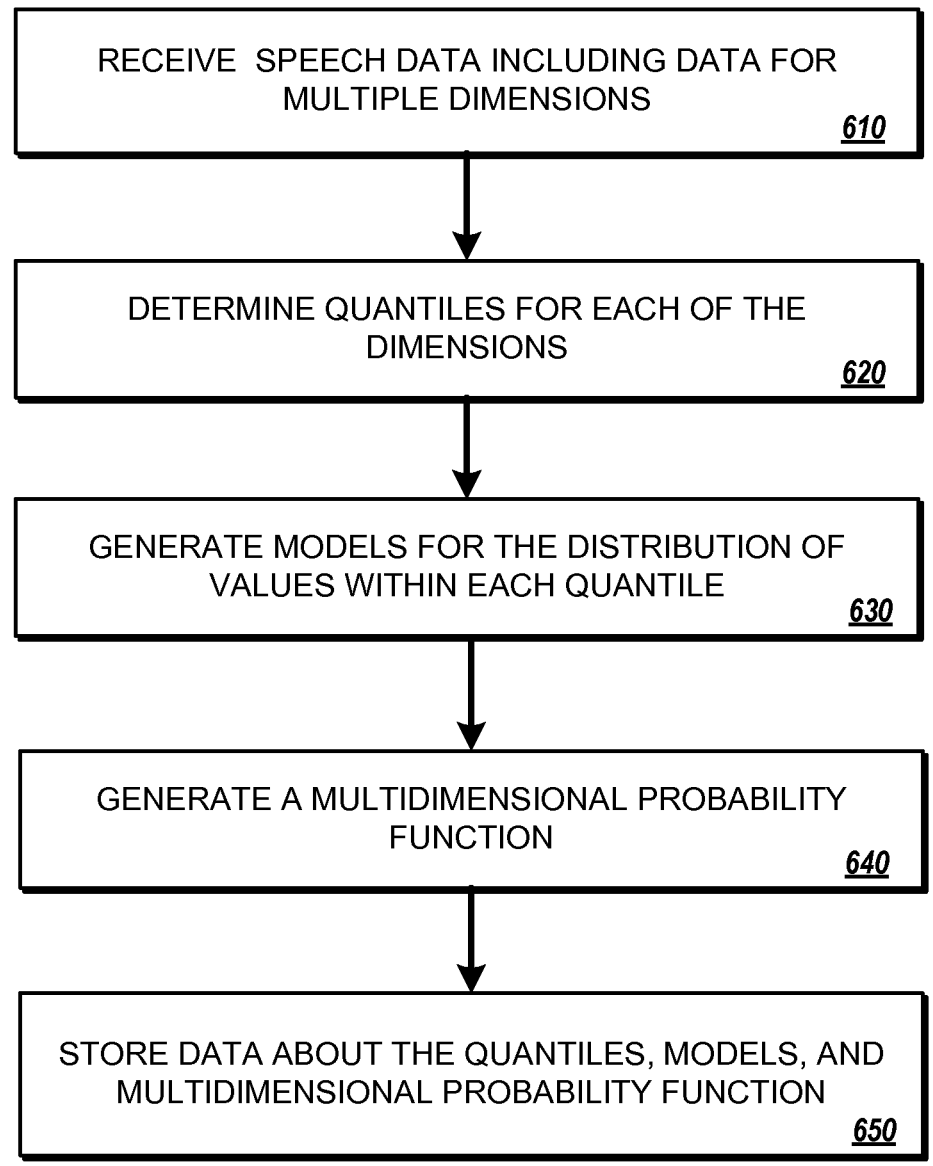
FIG. 6 is a flow diagram that illustrates an example of a process for generating a non-parametric model.

FIG. 6 is a flow diagram that illustrates an example of a process 600 for generating a non-parametric model. For example, the process 600 can be used to generate a portion of the acoustic model 140 that corresponds to a particular HMM state of a particular phone occurring in a particular phonetic context. When used to recognize speech, the portion of the acoustic model generated can assign a probability that a multidimensional speech frame represents an utterance of the particular HMM state of the particular phone, given that the speech frame occurs in the particular phonetic context. The process 600 may be performed by the selected processing module referred to in action (512) of the process 500, using the data identifying a training sequence (e.g., an M-phone) and corresponding speech data identified in the process 500.

Briefly, training data representing utterances with a shared phonetic context is received. Quantiles are defined for each of the dimensions. The distribution of values within each quantile is modeled. A multidimensional probability function is generated. Data is stored indicating boundaries of the quantiles, the distribution of values in the quantiles, and the multidimensional probability function.

In further detail, speech data that representing utterances with a shared phonetic context is accessed (610). For example, speech data is accessed that represents utterances of a particular phonetic unit occurring in a particular phonetic context. The speech data spans multiple dimensions. For example, the speech data can be a set of speech frames that correspond to the same M-phone, and thus have the same phonetic context indicated by the M-phone. Each speech frame can be a vector that includes a value for each of multiple dimensions, for example, a multi-dimensional real-valued vector. The speech data (e.g., training data) can be received as a result of the map-reduce processing described above, and may correspond to an entry from the stack of a reducer module.

Quantiles are defined for each of multiple dimensions (620). Each quantile is a range of values within the dimension. The quantiles that are defined can be equal occupancy quantiles, or quantiles that include the same number of samples. The quantiles for each dimension represent non-overlapping ranges of values. The set of quantiles for a dimension spans the entire range of possible values for the dimension, and as a result, any value in a dimension falls within exactly one quantile in the dimension.

To determine the quantile boundaries for a particular dimension, the processing module selects all of the values in the speech frames that correspond to the particular dimension. The selected values are considered samples in the particular dimension. The processing module sorts the samples, for example, in rank order. The processing module then sets the quantile boundaries so that most of or substantially all (e.g., all but one) of the quantiles for the particular dimension include the same predetermined number of samples. The highest quantile or lowest quantile may include fewer than the predetermined number of samples.

The quantile boundaries may be set at a particular multiple along the samples. For example, when each quantile includes 256 samples, a quantile boundary may be defined at the $256^{th}$ sample, $512^{th}$ sample, $768^{th}$ sample, $1024^{th}$ sample, and so on. Alternatively, the quantile boundaries may be set at a position between the last sample in one quantile and the first sample in the adjacent quantile. The quantile boundary may be set at a value halfway between the last sample of one quantile and the first sample of the next quantile. For example, when each quantile includes 256 samples, a quantile boundary may be set halfway between the $256^{th}$ sample and the $257^{th}$ sample, and halfway between the $512^{th}$ sample and the $513^{th}$ sample, and so on.

In some implementations, the boundaries for equal occupancy quantiles are determined such that each of the equal occupancy quantiles includes an equal number of values from the accessed speech data, and each equal occupancy quantile represents a range of values in a dimension that does not overlap with any other equal occupancy quantile. In some implementations, the number of quantiles for a dimension is not predetermined, but is instead based on the accessed speech data. For example, the boundaries may be determined such that the number of quantiles in the set of quantiles for each of the multiple dimensions is based on the accessed speech data.

Models are generated for the distribution of values within the quantiles (630). The distribution of values within each quantile is modeled separately. Each quantile of each dimension can have a different quantile-level probability function. The values or samples included in each quantile can be modeled with a probability density function (PDF). The PDF can span the entire quantile. For example, the quantile-level probability function for a quantile can be a univariate Gaussian distribution estimated based on the values of the samples in the quantile.

A multidimensional probability function is generated (640). The multidimensional probability function can indicate, for input speech data representing speech occurring in the particular phonetic context, a probability that the input speech data will have values that correspond to a given set of the quantiles for the multiple dimensions. The multidimensional probability function can indicate, for an input speech frame representing speech occurring in the particular phonetic context, a probability that the input speech frame will have values that correspond to a given set of the quantiles for the multiple dimensions, where the input speech frame is a multidimensional real-valued vector. The multidimensional probability function can indicate the probability based on all dimensions of the input speech frame.

In some implementations, the multidimensional model is a statistical language model is generated to indicate the probability that a speech frame has values that correspond to a particular sequence of quantiles. In some implementations, n-gram modeling is used to generate the multidimensional probability function. Conditional probabilities are calculated, where each conditional probability represents a probability of occurrence of a value in one quantile of one dimension, given the co-occurrence of values in particular quantiles of one or more other dimensions.

The multidimensional probability function can be an n-gram model where the n-grams are sequences of quantile identifiers and the sequences include quantile identifiers for quantiles in at least two dimensions. In some implementations, the number and identity of the n-grams for which conditional probabilities are included in the n-gram model are not predetermined. When generating the multidimensional probability function, the number and identity of the n-grams for which data is included in the n-gram model may be determined based on the accessed speech data (e.g., training data).

For example, a processing module can determine which quantiles include the values in a speech frame. For each speech frame, the processing module identifies a first quantile that includes the speech frame value for the first dimension, identifies a second quantile that includes the speech frame value for the second dimension, and so on. The quantiles each have corresponding quantile identifiers. For each speech frame (which is a vector of speech frame values), the processing module determines a quantile identifier vector, or a vector of quantile identifiers for the quantiles that include the respective speech frame values. The processing module then performs further processing on the set of quantile identifier vectors.

The processing module evaluates the quantile identifier vectors to determine conditional probabilities, such as the probability of occurrence of a particular quantile identifier in a quantile identifier vector given the co-occurrence of certain other quantile identifiers in the same quantile identifier vector. To determine the conditional probabilities, the processing module determines counts of the number of times various combinations or sequences of quantile identifiers occur within the set of quantile identifier vectors. In some implementations, the processing module counts sequences that are trigrams (e.g., a sequence of three quantile identifiers), bigrams (e.g., a sequence of two quantile identifiers), or another sequence of quantile identifiers co-occurring in a quantile identifier vector. The processing module then generates the conditional probabilities based on the counts.

In some implementations, one or more back-off models are generated for the multidimensional probability function. For example, where the multidimensional probability function is a trigram model, back-off models including a bigram model and a unigram model may also be generated.

The non-parametric model is stored (650). In some implementations, data indicating boundaries of the quantiles, the distribution of values in the quantiles, and the multidimensional probability function is stored. For example, the upper boundary or lower boundary of each of the quantiles is stored. Data indicating each of the quantile-level probability functions is also stored. For example, the mean and the variance of the univariate Gaussian distribution corresponding to each quantile are also stored. The multidimensional probability function is also stored. For example, when an n-gram model is generated, the conditional probabilities may be stored. As noted above, these conditional probabilities may each represent a probability of occurrence of a value in one quantile of one dimension, given the co-occurrence of values in particular quantiles of one or more other dimensions.

In some implementations, back-off models for the multidimensional probability function are also stored. For example, the conditional probabilities, n-gram counts and n-gram context counts, or other data for back-off models may be stored. As noted above, the n-grams for each of the back-off models are sequences of quantile identifiers observed in the accessed speech data (e.g., training data).

Figure 7:
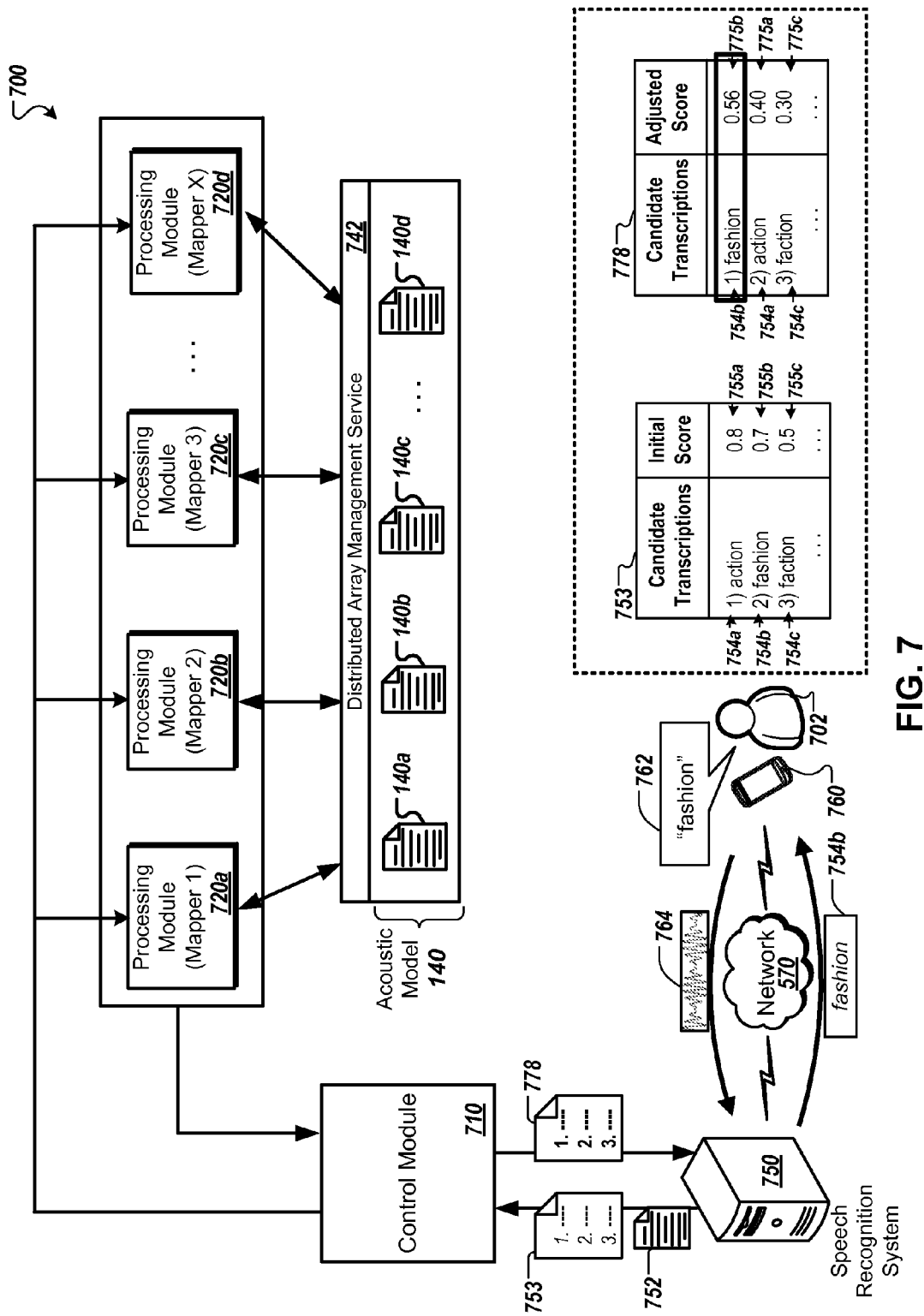
FIG. 7 is a diagram that illustrates an example of a system that can perform speech recognition using a variable length of phonetic context.

FIG. 7 is a diagram that illustrates an example of a system 700 that can perform speech recognition using variable lengths of phonetic context. The system 700 can use an acoustic model that recognizes varying lengths of phonetic context, such as the acoustic model 140, to recognize speech. The system 700 includes a number of processing modules, referred to as mappers 720a-720d. The system 700 also includes a control module 710, and a speech recognition system 750 that communicates with a computing device 760 over a network 770.

The computing device 760 can be, for example, a desktop computer, a laptop computer, a cellular phone, a smartphone, a personal digital assistant (PDA), a tablet computer, a wearable computer, a navigation system, or another computing device. The operations performed by the speech recognition system 750 can be performed by individual computer systems or can be distributed across multiple computer systems. The speech recognition system accesses the acoustic model 740, stored on one or more data storage devices, which can be connected directly or over the network 770. The network 770 can be wired or wireless or a combination of both. The network 770 can include one or more public or private networks, and can include the Internet.

The system 700 can assess candidate transcriptions for an utterance using different amounts of phonetic context. Test sequences having varying numbers of phonetic units are compared with contexts recognized by the acoustic model 140. The largest amount of phonetic context recognized by the acoustic model 140 is used to rank the candidate transcription. During evaluation of a candidate transcription, "backing off" to use a smaller context is penalized. This reflects that a match to a relatively small phonetic context in the acoustic model 140 suggests a lower likelihood of accuracy than matches to a large phonetic context in the acoustic model 140.

For example, speech data and data identifying a candidate transcription for the speech data are received. A phonetic representation for the candidate transcription can be accessed. Multiple test sequences can be extracted for a particular phone in the phonetic representation. Each of the multiple test sequences can include a different set of contextual phones surrounding the particular phone. Data indicating that an acoustic model includes data corresponding to one or more of the multiple test sequences can be received. From among the one or more test sequences, the test sequence that includes the highest number of contextual phones can be selected. A score for the candidate transcription can be generated based on the data from the acoustic model that corresponds to the selected test sequence.

In the example illustrated in FIG. 7, the computing device 760 records audio that contains an utterance 762, "fashion," spoken by a user 702 of the computing device 760. The computing device 760 sends speech data 764 representing the utterance 762, such as a waveform or other form of encoded audio, to the speech recognition system 750.

The speech recognition system 750 can include a front end module that extracts speech parameters from the speech data 764. For example, the speech recognition system 750 can extract a series of speech frames 752, where each frame is a feature vector that represents speech characteristics that occur during approximately 10 milliseconds of input speech. Any appropriate feature extraction algorithm can be used, including, for example, algorithms that extract mel-frequency cepstral components (MFCCs).

The speech recognition system 750 performs a "first pass" of speech recognition to identify candidate transcriptions for the utterance 762. The speech recognition system 750 can use an acoustic model other than the acoustic model 140. For example, the acoustic model used for the first pass may be locally stored, rather than distributed, and may use a fixed amount of phonetic context (e.g., 3 phones) rather than a variable amount of phonetic context. In some implementations, the acoustic model used for the first pass recognition is trained using training data or training techniques different from those used to train the acoustic model 140.

The first pass recognition phase produces candidate transcriptions 754a-754c, each of which is assigned a corresponding score 755a-755c. Each score 755a-755c can indicate, for example, a likelihood that the candidate transcription to which the score is assigned is a correct transcription for the utterance 762. For example, the scores 755a-755c can be confidence scores, output by the acoustic model used for the first pass recognition, that indicate the model's confidence that the candidate transcription is correct. The candidate transcriptions 754a-754c are ranked according to the scores 755a-755c.

The speech recognition system 750 selects a subset of the candidate transcriptions 754a-754c for a "second pass" of speech recognition using the acoustic model 140. For example, a highest-ranking subset of the candidate transcriptions 754a-754c (e.g., the set of candidate transcriptions 754a-754c believed most likely to be correct) can be selected. In some implementations, the speech recognition system 750 selects the L highest-ranking candidate transcriptions 754a-754c, where L is an integer, such as 5, 10, or 20. Other values of L can also be used.

The speech recognition system 750 outputs the speech frames 752 and recognition data 753, which identifies the candidate transcriptions 754a-754c and the corresponding scores 755a-755c, to a distributed computing framework that performs the second pass of speech recognition. For example, the speech recognition system 750 can transmit the recognition data 753 to a control module 710, such as a master processing module of a MapReduce implementation. The control module 710 assigns recognition tasks to the mappers 720a-720d, and coordinates outputs of the second pass of recognition.

In some implementations, the control module 710 assigns the mappers 720a-720d to recognize different utterances in a speech sequence. For example, from a sequence of multiple words spoken by the user 702, the control module 710 provides speech frames and candidate transcriptions for a first word to the mapper 720a, provides speech frames and candidate transcriptions for a second word to the mapper 720b, and so on. Thus a series of utterances by a user 702 may be processed by different mappers 702a-702d. Similarly, when recognizing speech from multiple users, the various mappers 702a-702d can recognize utterances for different users.

In the illustrated example, the control module 710 assigns a single mapper, e.g., the mapper 720a, to evaluate all of the candidate transcriptions 754a-754c. Because all of the candidate transcriptions 754a-754c corresponding to the utterance 762 are evaluated at the same mapper 720a, there is no need to replicate the speech frames 752 among multiple mappers 720a-720d, which conserves bandwidth and facilitates efficient processing of large amounts of data.

The mapper 720a determines a phonetic representation for each of the candidate transcriptions 754a-754c, and extracts test sequences of phonetic units, as described in further detail below with respect to FIG. 6. For example, for a given candidate transcription, the test sequences can include a maximal order M-phone and corresponding back-off M-phones for each HMM state of each phone in the phonetic representation for the candidate transcription. The mapper 720a extracts the test sequences for each of the candidate transcriptions 754a-754c in the highest-ranking set of candidate transcriptions.

Using the extracted test sequences, the mapper 720a obtains acoustic model data from the acoustic model 140. The acoustic model 140 can be accessed through a distributed array management service 742. The service 742 can be an in-memory key-value serving system (e.g., an SSTable service) with S server modules (not shown) each storing 1/S-th of the data in the acoustic model 140. For example, each of the S server modules can store one or more of the partitions 140a-140d in RAM.

In response to a request, the service 742 can look up acoustic model data (e.g., a non-parametric model stored in the acoustic model 140) that corresponds to a given test sequence, if data for that phonetic sequence exists in the acoustic model 140. The mapper 720a sends a batch request that identifies the extracted test sequences. In response, the service 742 retrieves acoustic model data for the test sequences from the various partitions 140a-140d of the acoustic model 140.

To identify the appropriate partition in which to obtain data for a given test sequence, the service 742 uses the same partitioning keys that were used to train the acoustic model 140. For example, the partitioning key that identifies a test sequence is a function of the HMM state identity and the central triphone of the sequence. As an example, for a test sequence "ih_1/ae k sh_n sil~," the partitioning key can be "ih_1/sh_n," or another representation of this sequence. The service 742 identifies the appropriate partition 140a-140d that corresponds to the partitioning key. Within the identified partition, the acoustic model data for the test sequence can be obtained using a key that uniquely specifies the portion of the acoustic model 140 that corresponds to that test sequence (e.g., a key based on the full test sequence "ih_1/ae k sh_n sil~"). For each of the test sequences, the service 742 provides the corresponding acoustic model data to the mapper 720a that requested the data.

The mapper 720a uses the acoustic model data adjust the scores 755a-755c for the candidate transcriptions 754a-754c. For example, for each candidate transcription, the mapper 720a can generate a score that indicates a likelihood, based on the received data from the acoustic model 140, that the candidate transcription is a correct transcription for the speech frames 752, and thus for the utterance 762. Scores based on data from the acoustic model 140 can be combined with the scores 755a-755c from the first pass of recognition to produce adjusted scores 775a-775c. The candidate transcriptions 754a-754c are re-ranked according to the adjusted scores 775a-775c.

As described further below, the evaluation of the candidate transcriptions is performed using the model data for the largest phonetic context that the acoustic model 140 recognizes. When acoustic model data is obtained for a test sequence that is a maximal order M-phone, which represents the maximum amount of phonetic context, that acoustic model data is used to generate the adjusted score. However, when acoustic model data is not available for a maximal order M-phone, the mapper 720a uses acoustic model data for the back-off M-phone having the highest number of contextual phones to generate the adjusted score. Thus, for a given candidate transcription, the acoustic model data used to assess different HMM states may have output distributions corresponding to different lengths of phonetic context. Some non-parametric models used may have been trained based on 5 phones before and/or after a subject phone, other non-parametric models used may have been trained using 4 phones before and/or after a central phone, and so on. Nevertheless, by using the acoustic model data for the largest amount of phonetic context, the system can improve the accuracy of recognition.

After re-ranking the candidate transcriptions 754a-754c, the mapper 720a sends recognizer data 778 that identifies the updated ranking to the control module 710, which sends the recognizer data 778 to the speech recognition system 750. The speech recognition system 750 uses the updated ranking to select one or more candidate transcriptions 754a-754c to provide to the computing device 760. In the illustrated example, the candidate transcription 754b, "fashion," is provided as a transcription for the utterance 762. While the first pass of speech recognition considered the candidate transcription 754a, "action," to be the most likely transcription, the second pass using the acoustic model 140 adjusted the ranking to indicate that the candidate transcription 754b, "fashion," was most likely to be correct.

In general, evaluating a transcription using a higher number of contextual phones can produce more accurate results than using a lower number of contextual phones. Accordingly, using an acoustic model 140 that can recognize a variety of lengths of phonetic context can provide better recognition accuracy than systems that only recognize a fixed length of phonetic context. The improvement in accuracy can be quantified in lower word-error rates (WER) for acoustic models that use back-off M-phones, as compared to techniques that use acoustic models that use only fixed-length phonetic context.

Figure 8:
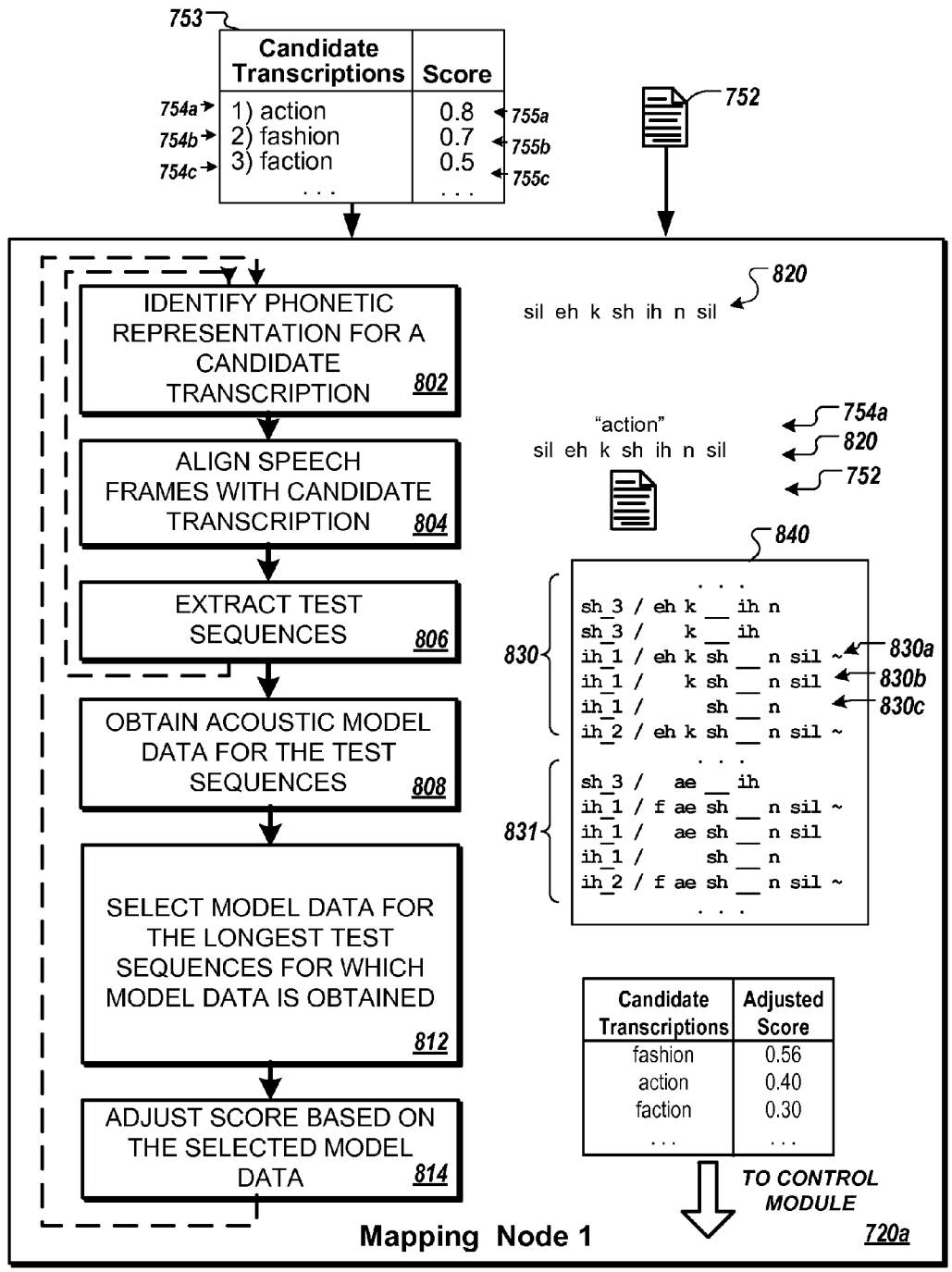
FIG. 8 is a diagram that illustrates processing performed by a mapper to evaluate candidate transcriptions for an utterance.

FIG. 8 is a diagram that illustrates processing performed by a mapper to evaluate candidate transcriptions for an utterance. In the illustrated example, the mapper 720a of FIG. 7 receives the recognizer data 753 and speech frames 752 described above. The mapper 720a evaluates the N highest-ranking candidate transcriptions 754a-754c for the utterance 762.

The mapper 720a identifies a phonetic representation 820 for a candidate transcription 754a (802). The mapper 720a can obtain the phonetic representation 820 from, for example, a pronunciation lexicon, as described above.

The mapper 720a aligns the speech frames 752 with the candidate transcription 754a (804). The mapper 720a can generate a context-dependent state level Viterbi alignment after composing H∘C∘L, where L, C, and H respectively denote the pronunciation lexicon, a context dependency tree, and HMM-to-state FSTs, as described above.

The mapper 720a extracts test sequences 830 from the phonetic representation 820 (806). The test sequences 830 can be M-phones, as described above. For example, for each HMM state of each phone in the phonetic representation 820, a maximal order M-phone can be extracted, and back-off M-phones can also be extracted down to a central triphone. The maximum value of M can be the same as the maximum value of M used to train the acoustic model 140. In the illustrated example, the maximum value of M is 3, but other values, such as 2, 4, 5, 7, etc., can be used.

As described above, when the phonetic context around a phone is not symmetrical, the mapper 720a extracts test sequences that include asymmetric numbers of contextual phones before and after the phone. The symbol "~" denotes a vacant contextual position in an asymmetrical M-phone. Extracting asymmetrical M-phones as test sequences 830 permits a larger amount of context to be matched in the acoustic model 140 than, for example, simply using a lower order M-phone and omitting one or more contextual phones from the end with the longest context. Using asymmetrical M-phones can be particularly helpful for recognizing phones that occur at or near a word or sentence boundary, where phonetic context on one side of the phone may be limited. The mapper 720a can extract asymmetrical test sequences by backing off from only the side of the central phone that includes the largest number of contextual phones, until a symmetrical numbers of contextual phones are present around the central phone. The mapper 720a can then back-off from both sides, thereafter generating test sequences with symmetrical numbers of contextual phones around the central phone.

In some implementations, the mapper 720a obtains a phonetic representation (802), aligns the phonetic representation to the speech frames 752 (804), and extracts test sequences (806) for each of the candidate transcriptions 754a-754c. For example, the mapper 720a extracts the test sequences 831 from a phonetic representation for the candidate transcription 754b, "fashion." Test sequences are also extracted for the candidate transcription 754c and any other candidate transcriptions received by the mapper 720a. In some implementations, the mapper 720a adds the test sequences 830, 831 for all of the candidate transcriptions 754a-754c to a pool or set 840. The set 840 is initialized once for each utterance (e.g., each word).

The mapper 720a obtains acoustic model data for the test sequences 830, 831 in the set 840 (808). For example, the mapper 720a sends data identifying the test sequences 830, 831 in the set 840 to the distributed array management service 742 as a batch request. In particular, the mapper 720a can initiate a remote procedure call to a master processing module of the service 742, identifying the test sequences 830, 831 in the set 840. The master processing module then attempts to look up the non-parametric model corresponding to each test sequence in the set 840.

The master processing module applies the partitioning function to each test sequence, thus obtaining the respective partitioning keys for the test sequences. The partitioning keys identify which partitions 140a-140d will contain the data for the non-parametric models corresponding to the test sequences, if the non-parametric models exist in the acoustic model 140. Data in the partitions 140a-140d can be served by different server modules, each assigned different partitioning keys. The master processing module identifies the server modules assigned to the identified partitioning keys, and requests from each server module the non-parametric model data for the test sequences associated with its assigned partitioning key(s). When the partition(s) 140a-140d handled by a server module include a non-parametric model entry for a test sequence (e.g., an entry for a key that uniquely corresponds to the test sequence), the server module provides the non-parametric model data to the master processing module, which provides the non-parametric model data to the mapper 720a. When the partition(s) 140a-140d of a server module do not include an entry for a test sequence, no data is returned for that test sequence.

From the received acoustic model data, the mapper 720a selects the acoustic model data that corresponds to the longest test sequences (e.g., those including the highest number of contextual phones) (812). As an example, the test sequences 830 for the candidate transcription 754a include a 3-phone 830a, a 2-phone 830b, and a 1-phone 830c for the "ih_1" HMM state. If acoustic model data is received for each of the test sequences 830a-830c, then the data received for the 3-phone 830a is used to score the "ih_1" HMM state, and the data for the 2-phone 830b and the 1-phone 830c is not used. However, if no acoustic model data is received for the 3-phone 830a, then the data received for the test sequence having the next-highest number of contextual phones—the 2-phone 830b—is used. By selecting the acoustic model data for test sequences having the highest number of contextual phones, the mapper 720a ensures that the maximum amount of phonetic context recognized by the acoustic model 140 is used.

The mapper 720a then adjusts the scores 755a-755c for the candidate transcriptions 754a-754c using the selected acoustic model data. The selection of the acoustic model data and adjustment of the scores 755a-755c is described in further detail with respect to FIG. 9.

Figure 9:
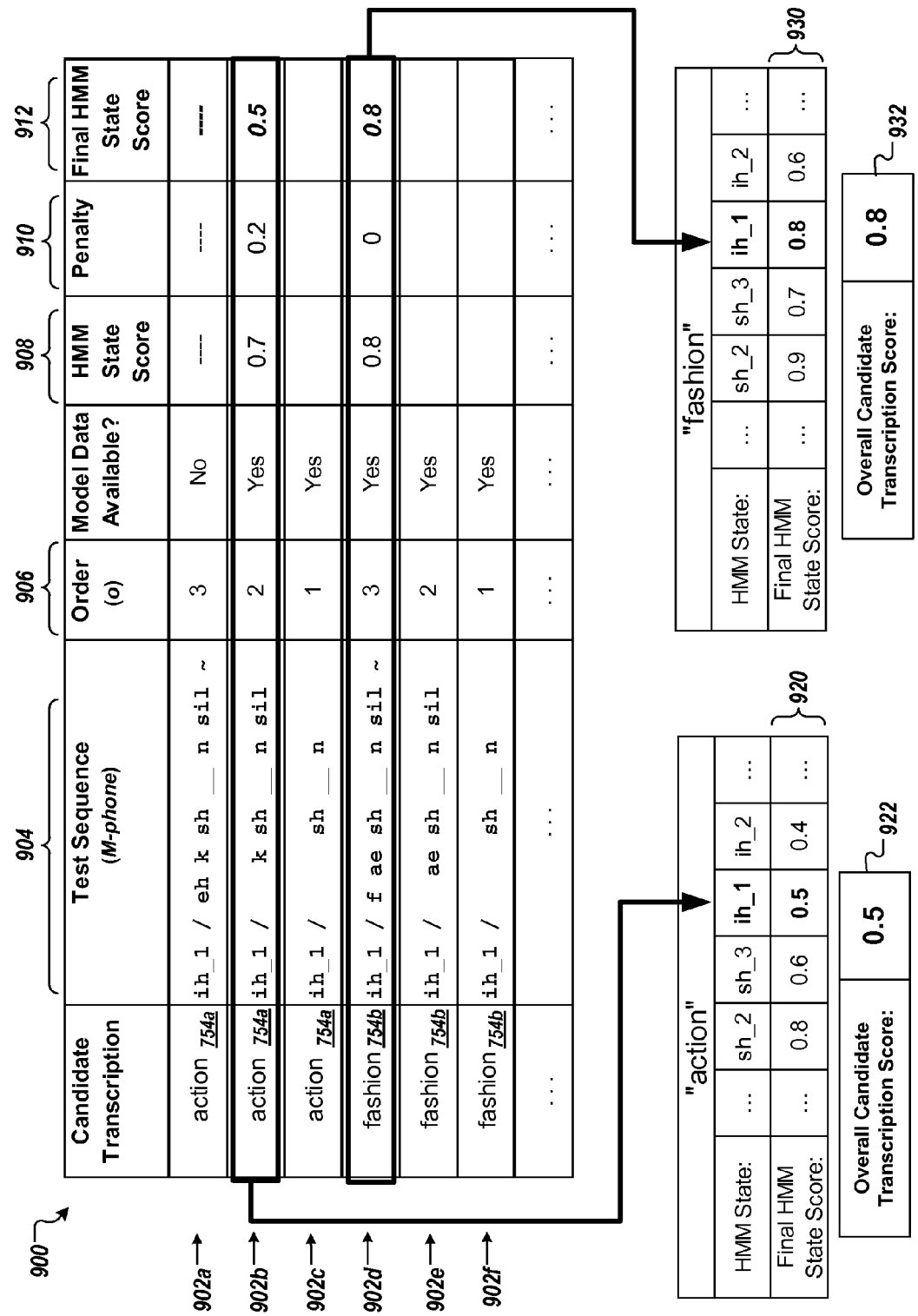
FIG. 9 is a diagram that illustrates scoring of candidate transcriptions.

FIG. 9 is a diagram that illustrates scoring of candidate transcriptions. FIG. 9 includes a table 900, and each row 902a-902f corresponds to a different test sequence 904. The table 900 also indicates the order 906 of each test sequence 904, or in other words, the number of contextual positions before and after a central phone that are included in the test sequence 904.

When the mapper 720a requests acoustic model data for the test sequences 904, the distributed array management service 942 may provide acoustic model data for fewer than all of the test sequences 904. In other words, there may be some test sequences 904 that represent phonetic contexts that are not recognized by the acoustic model 140, and so no corresponding data is available. When acoustic model data for the highest-order training sequence is not available (e.g., for order M=3 in the illustrated example), the mapper 720a backs-off to use data for a training sequence representing a smaller amount of phonetic context.

As an example, the rows 902a-902c each include training sequences 904 corresponding to the "ih_1" HMM state in the phonetic representation of the candidate transcription 754a "action." The table 900 indicates, however, that no acoustic model data is available for the 3-phone in the row 902a, which includes the highest number of contextual phones. As a result, acoustic model data for one of the back-off test sequences is used. In particular, acoustic model data is available for the 2-phone in the row 902b, so the acoustic model data for that test sequence is used to generate a score for the "ih_1" HMM state.

As another example, the rows 902d-902f each include training sequences 904 corresponding to the "ih_1" HMM state in the phonetic representation of the candidate transcription 754b "fashion." Because acoustic model data is available for the maximal order test sequence, the 3-phone in row 902d, the acoustic model data for that row is selected.

With the selected acoustic model data, the mapper assigns an HMM state score 908 for each HMM state in the phonetic representation of each candidate transcription. The HMM state scores 908 can indicate a likelihood that the HMM state accurately represents the corresponding speech frames, given the phonetic context in the test sequence 904. The retrieved acoustic model data for a test sequence 904 can include data that describes a non-parametric model trained for the particular HMM state and phonetic context indicated by the training sequence 904. An example of generating an HMM state score 908 for a speech frame using a non-parametric model is described with respect to FIG. 11.

To penalize the use of lower-order training sequences, a per-frame back-off cost can be incurred for training sequences having an order 906 less than the maximum value of M. The penalty 910 for a back-off training sequence can be assigned with the following equation:

Penalty=$C \times (M_{max}-o)$, where C is a unit cost per backed-off phone, the amount of the $M_{max}$ is the maximum value of M, and o is the order of a test sequence. Accordingly, the more phones that are dropped or backed-off (and thus the fewer contextual positions represented by the test sequence), the higher the penalty 910. In some implementations, test sequences that include asymmetric numbers of contextual phones are not penalized. The order, o, of an asymmetric test sequence is computed as the maximum of the number of contextual phones before the central phone and the number of contextual phones after the central phone.

In the illustrated example, the value of C is set at 0.2, and the value of $M_{max}$ is 3. For the 2-phone in the row 902b, one contextual phone or contextual position is omitted relative to the maximal order 3-phone. As a result, the penalty 910 for the row 902b is 0.2×(3−2), for a penalty of 0.2. By contrast, the 3-phone in row 902d is a maximal order training sequence, and since no contextual phones were omitted, no penalty is incurred.

The mapper 720a applies the penalties 910 to the HMM state scores 908 to generate final HMM state scores 912. The penalties 910 can be applied by, for example, subtracting the penalty from the HMM state scores 908, or otherwise adjusting the HMM state scores 908 to indicate a reduced confidence that the HMM state is correct. The final HMM state scores 912 are then used to generate scores for the candidate transcriptions. The techniques described can be used to generate a final HMM state score for each of the HMM states of each phone in the phonetic representation for a candidate transcription.

In some instances, acoustic model data is not available for any of the test sequences for a given HMM state and phonetic context. In that case, the mapper 720a can rely on an earlier score for the HMM state produced during the first pass of speech recognition. Because none of the test sequences were recognized by the acoustic model 140, a penalty can be applied to the first-pass score. When the mapper 720a backs-off all the way to using the first pass acoustic model, the order, o, can be considered to be zero, and the per-phone back-off cost may reach its maximum value.

The combined set of HMM state scores is then used to generate an overall score for each candidate transcription. In the illustrated example, the scores 920 are assigned for the different HMM states of the phonetic representation for the candidate transcription 754a, "action." Combining the scores 920 produces an overall score 922 of "0.5" for the candidate transcription 754a. The scores 930 are assigned for the different HMM states of the phonetic representation for the candidate transcription 754b, "fashion." Combining the scores 930 produces an overall score 932 of "0.8" for the candidate transcription 754b. In the illustrated example, the higher overall score for the candidate transcription 754b indicates that, using the acoustic model 140 with variable phonetic contexts, the transcription "fashion" is considered more likely to be a correct transcription for the speech frames 964 than "action."

The overall scores 922, 932 for the acoustic model 140 can be combined with the scores 755a-755c from the first pass of speech recognition to determine the adjusted scores 775a-775c used to rank the candidate transcriptions 754a-754c in FIG. 7. The adjusted score 775a-775c for each candidate transcription 754a-754c is computed by log-linear interpolation between the scores 755a-755c produced by the first pass acoustic model, and the overall scores 922, 932 produced using the second pass acoustic model 140. The final score can be calculated using the following equation:

$\log P_{AM}(A|W) = \lambda \cdot \log P_{first_{pass}}(A|W) + (1.0-\lambda) \cdot \log P_{second\,pass}(A|W)$, where A denotes the acoustic features, W denotes the word sequence, and $\lambda$ is a weighting value that sets the influence of the first pass and second pass acoustic models. In the illustrated example, the scores for the first pass acoustic model and the second pass acoustic model are equally weighted. Addition in logarithmic probability space results in multiplication in regular probability space. As an example, the score 975b for the candidate transcription 754b can have a value of 0.56, resulting from the value of the score 755b (e.g., 0.7) multiplied by the score 932 (e.g., 0.8).

In some implementations, the scores used to rank the candidate transcriptions are also based on the output of one or more language models. The combined score for the a candidate transcription based on acoustic model probability scores and language model probability scores can be computed with the following equation:

$$\log P(W|A) = 1/lmw \cdot \log P_{AM}(A|W) + \log P_{LM}(W),$$

where A denotes the acoustic features, W denotes the word sequence, and lmw is the language model weight. The scores reflecting both the acoustic model output and the language model output can be used to select one or more transcriptions that are determined to be most likely to be correct.

Figure 10:
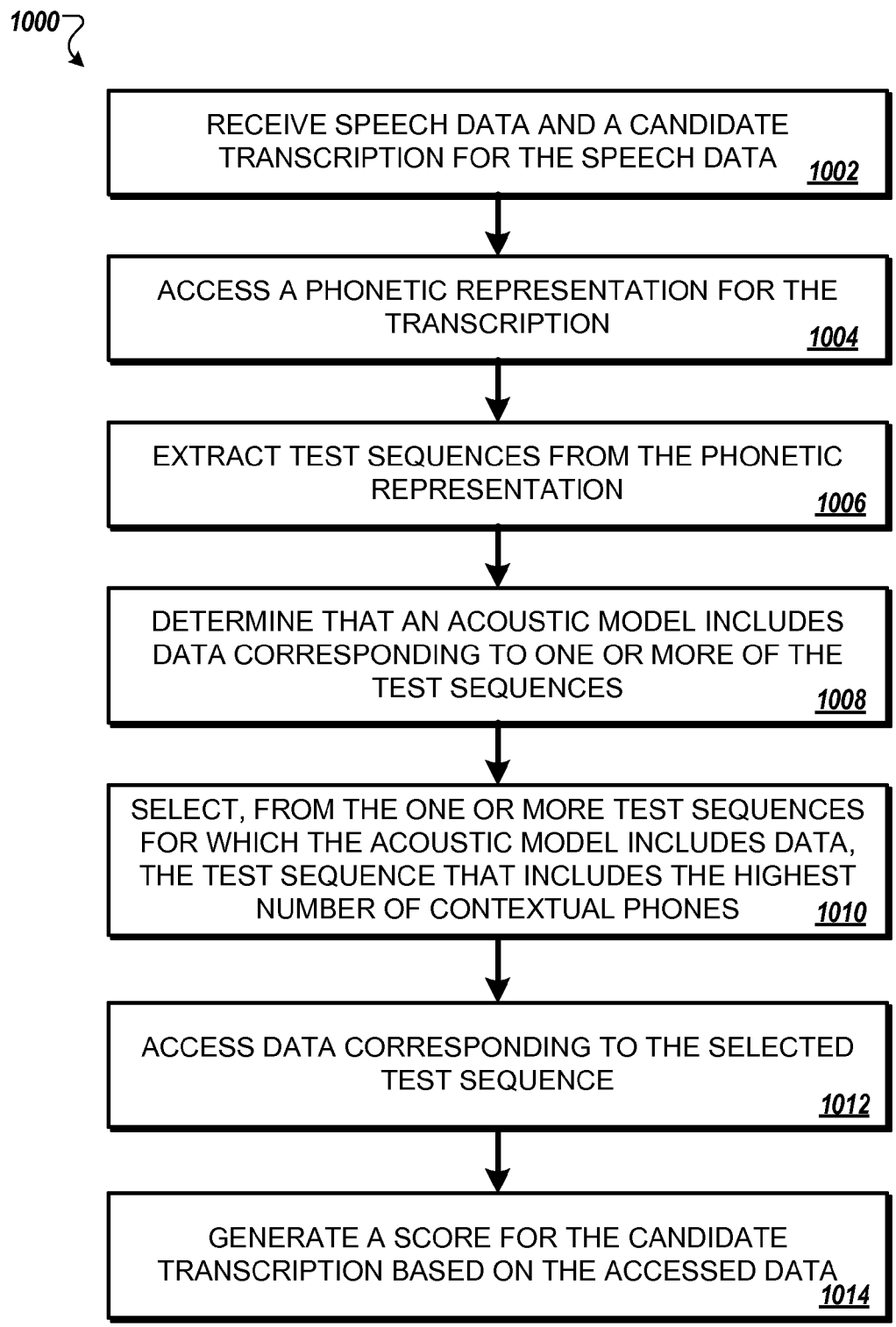
FIG. 10 is a flow diagram that illustrates an example of a process for recognizing speech using a variable length of phonetic context.

FIG. 10 is a flow diagram that illustrates an example of a process 1000 for recognizing speech using a variable length of phonetic context. Briefly, the process 1000 includes receiving speech data and data identifying a candidate transcription for the speech data, accessing a phonetic representation for the candidate transcription, extracting multiple test sequences from the phonetic representation, receiving data indicating that an acoustic model includes data corresponding to one or more of the multiple test sequences, selecting, from among the one or more test sequences for which the acoustic model includes data, the test sequence that includes the highest number of contextual phones; accessing data from the acoustic model corresponding to the selected test sequence, and generating a score for the candidate transcription based on the data from the acoustic model that corresponds to the selected test sequence.

In further detail, speech data and data identifying a candidate transcription for the speech data are received (1002). The speech data can include feature vectors that indicate speech characteristics. A feature vector can be received for each of multiple speech frames, where each speech frame represents, for example, 10 milliseconds of speech. The speech data and the candidate transcription can be received at a distributed computing system.

A phonetic representation for the candidate transcription is obtained (1004). The phonetic representation can be a sequence of context-independent phones.

Multiple test sequences are extracted from the phonetic representation (1006). The multiple test sequences are extracted for a particular phone in the phonetic representation, and each of the multiple test sequences include a different set of contextual phones surrounding the particular phone.

For example, each of the test sequences can be an M-phone, with a different integer value of M, as described above. The extracted test sequences can include at least, for example, a first sequence that includes one contextual phone before the particular phone and/or one contextual phone after the particular phone, a second sequence that includes two contextual phones before the particular phone and/or two contextual phones after the particular phone, and a third sequence that includes three contextual phones before the particular phone and/or three contextual phones after the particular phone. Each of the test sequences can be sequences of consecutive phones in the phonetic representation.

One or more asymmetric test sequences that include asymmetric numbers of contextual phones before and after the particular phone can be extracted. In addition, one or more symmetric test sequences that include symmetric numbers of contextual phones before and after the particular phone can be extracted. Each of the symmetric test sequences can include fewer contextual phones than each of the one or more asymmetric test sequences. In other words, when backing off from a maximal order M-phone to generate the back-off M-phones, contextual phones can be removed from only the side of the particular phone that includes the most contextual phones. Contextual phones can be removed from one side until a symmetric number of phones about the particular phone are present, and then contextual phones can then be omitted, or backed-off, from both sides of the contextual phone.

In some implementations, at least five test sequences are extracted. The at least five test sequences include test sequences that respectively include any contextual phones occurring within one, two, three, four, or five contextual positions before and after the particular phone. In the test sequences, contextual positions that do not include a contextual phone can be indicated as vacant.

Data indicating that an acoustic model includes data corresponding to one or more of the multiple test sequences is received (1008). To receive the data, a request identifying each of the multiple test sequences can be sent. Data from the acoustic model can be received for each of the one or more test sequences recognized by the acoustic model. The acoustic model data that is received for a test sequence, if the data exists in the model, can be a non-parametric model associated with the particular HMM state and phonetic context for that test sequence.

In some implementations, data for the test sequences is obtained from a distributed associative array. To obtain data from the distributed associative array, a partitioning key can be identified based on a sequence of phones that occurs in each of the multiple test sequences. For example, the partitioning key for a test sequence can be based on the central triphone of the test sequence. The same partitioning function used to train the acoustic model can be used to access data from the distributed associative array. A partition of the distributed associative array can be identified based on the partitioning key. In some implementations, a server module is that to which the partitioning key is assigned is determined. The data corresponding to the multiple test sequences can be obtained from the identified partition, or from the identified server module to which the partitioning key is assigned.

From among the one or more test sequences for which the acoustic model includes data, the test sequence that includes the highest number of contextual phones is selected (1010). In other words, the longest test sequence that is recognized by the acoustic model is selected. The selected test sequence can be a test sequence that includes a predetermined maximum number of contextual phones, for example, the maximal order M-phone of the multiple test sequences. In some instances, however, one of the test sequences that includes fewer than the predetermined maximum number of contextual phones is selected. When portions of the process 1000 are repeated to evaluate different phones of the phonetic representation, the test sequences selected for the different phones can have different numbers of contextual phones surrounding their respective central phones.

Data from the acoustic model corresponding to the selected test sequence is accessed (1012). The accessed data can include data describing a non-parametric model (non-parametric model), for example, a non-parametric model corresponding to a central phone of the selected test sequence. The non-parametric model can define an output distribution for an HMM state of the particular phone, the output distribution being conditioned on the particular sequence of contextual phones included in the selected test sequence. The accessed data can be the received data indicating that an acoustic model includes data corresponding to one or more of the multiple test sequences. Accessing the data can include accessing the data from a distributed associative array, as described above.

A score for the candidate transcription is generated based on the data from the acoustic model that corresponds to the selected test sequence (1014). The score can be a confidence score or probability measure that indicates a likelihood that the candidate transcription is an accurate transcription for the speech data. The score can indicate that a particular portion of the candidate transcription is correct, where the particular portion is the particular phone or a sub-phone component, such as one of several HMM states used to model the particular phone.

When the selected test sequence includes fewer than the predetermined maximum number of contextual phones, a penalty can be determined. A first score, such as a confidence score or probability measure, can be adjusted based on the penalty. Compared to the first score, the adjusted score can indicate a lower likelihood or confidence that the candidate transcription is an accurate transcription for the speech data. The magnitude of the penalty can be determined based on a difference between the number of contextual phones in the selected test sequence and the predetermined maximum number of phones. For example, where the predetermined maximum number of contextual phones is 3 or higher, the penalty for a test sequence that includes two contextual phones before or after the particular phone can be less than the penalty for a test sequence that includes only one contextual phone before or after the particular phone.

In some implementations, generating the score for the candidate transcription includes adjusting a score assigned to the candidate transcription using a different acoustic model, such as an acoustic model that uses a fixed length of phonetic context or an acoustic model that does not rely on phonetic context.

The process 1000 can be used to evaluate multiple phones in the phonetic sequence. For example, the process 1000 can include extracting multiple second test sequences can from the phonetic representation for a second phone that is different from particular phone. Each of the multiple second test sequences including a different set of contextual phones surrounding the second phone. Data indicating that the acoustic model includes one or more of the multiple second test sequences is received. From among the one or more second test sequences for which the acoustic model includes data, the second test sequence that includes the highest number of contextual phones is selected. Data from the acoustic model corresponding to the selected second test sequence is accessed. The score that is generated for the candidate transcription can be based on the data from the acoustic model that corresponds to selected second test sequence as well as the data from the acoustic model that corresponds to the other selected test sequence. In addition, or as an alternative, a score for the second phone, or an HMM state of the second phone is generated.

The process 1000 can be repeated for multiple candidate transcriptions, and the scores generated for each candidate transcription can be used to rank or re-rank the candidate transcriptions according to a likelihood or confidence that the candidate transcriptions are correct transcriptions for the speech data.

Figure 11:
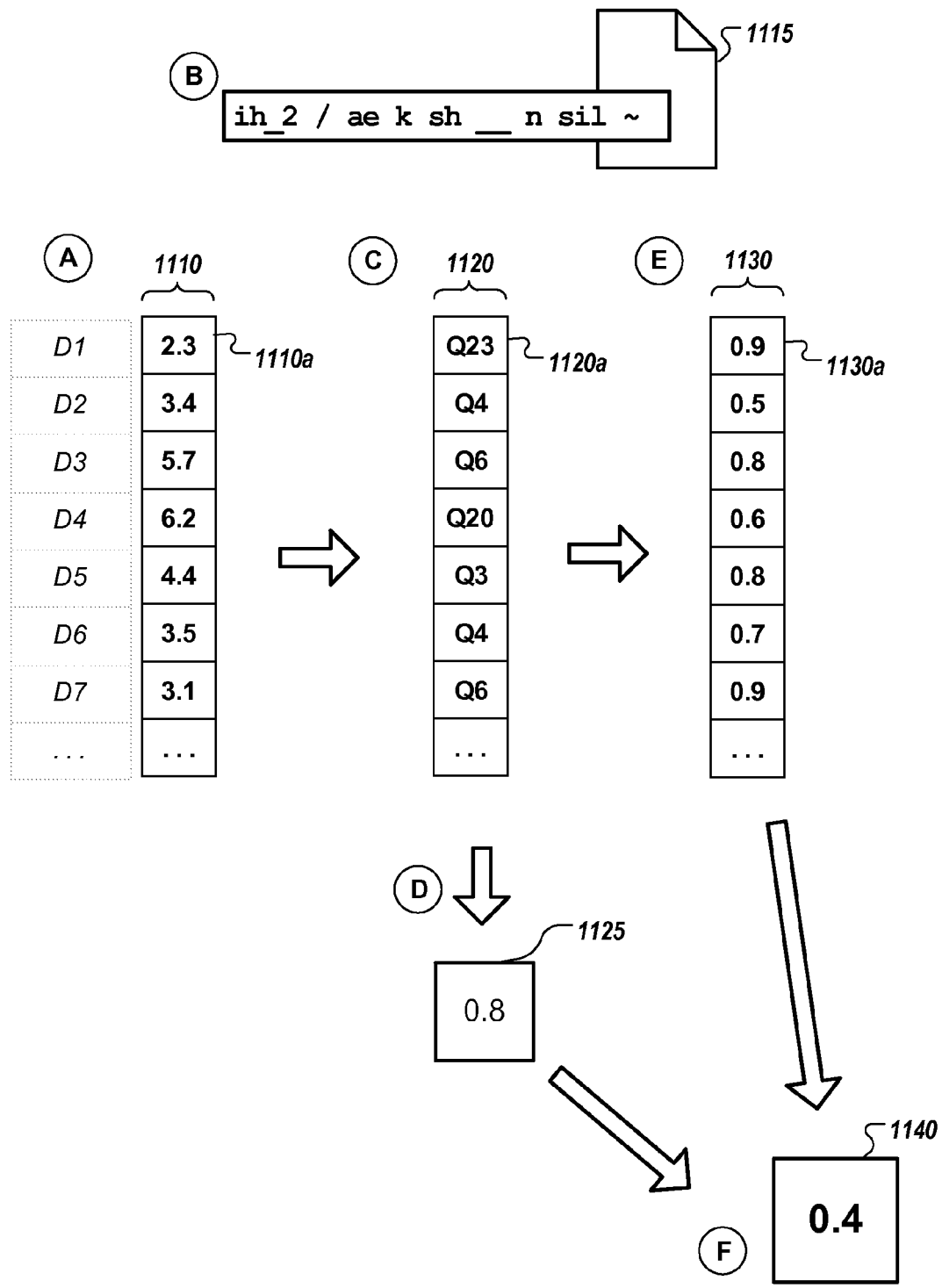
FIG. 11 is a diagram that illustrates an example of techniques for determining a probability score using a non-parametric model.

FIG. 11 is a diagram that illustrates an example of techniques for determining a probability score using a non-parametric model. The diagram shows stages (A) to (F), which illustrate a flow of data, and which may occur in the sequence illustrated or in a different sequence.

A processing module, such as the mapper 720a, can use a non-parametric model to determine a probability that a speech frame occurring in a known phonetic context corresponds to a particular HMM state. In the illustrated example, the mapper 720a determines a probability that a speech frame 1110 corresponds to the "ih_2" HMM state, given that the speech frame 1110 occurs in the phonetic context "ae k sh_n sil~." The probability can then be used to evaluate a candidate transcription for the utterance from which the speech frame 1110 was extracted. For example, the probability may be one of the probability scores 908 of FIG. 9 used to evaluate a candidate transcription for the utterance 762. In the example, the candidate transcription under evaluation is the candidate transcription 754a, "action."

In stage (A), the mapper 720a obtains a speech frame 1110 to be tested. For example, the speech frame 1110 can be one of the speech frames 752, which were extracted from speech data 764 that represents a user utterance 762 to be recognized by the system 700.

In stage (B), the mapper 720a accesses the portion of the acoustic model 140 corresponding to the M-phone the speech frame 1110 is to be tested against. For example, the candidate transcription for the user utterance 762 may indicate that the appropriate HMM state for the speech frame 1110 is "ih_2" and that the "ih" phone is located within the phonetic context "ae k sh_n sil~." Based on this information, the mapper 720a retrieves a non-parametric model 1115 that is associated with the M-phone "ih_2/ae k sh_n sil~" in the acoustic model 140.

In some implementations, the non-parametric model 1115 indicates (i) quantile boundaries for quantiles in each of the dimensions of the speech frame 1110, (ii) a quantile-level probability function for each quantile, and (iii) a multidimensional probability function that spans multiple dimensions. The quantile-level probability functions can be probability density functions each representing the distribution of values within a quantile. For example, for the quantile-level probability functions, the non-parametric model can include the mean values and variances of univariate Gaussian distributions, such as the Gaussian distributions 430a-430f of FIG. 4A. The multidimensional probability function can indicate the probability of co-occurrence of a particular sequence of quantile identifiers. For example, the multidimensional probability function can be an n-gram model such as the model used to calculate P(Q(y)) described above. The non-parametric model 1115 can include the conditional probabilities that permit the probability to be determined for a vector of quantile identifiers.

In stage (C), the mapper 720a identifies the quantiles that include the various values of the speech frame 1110. For example, the mapper 720a generates a quantile identifier vector 1120 for the speech frame 1110. The quantile identifier vector 1120 indicates the quantile identifiers (e.g., Q1, Q2, Q3, etc.) of the quantiles that include the various values of the speech frame 1110. For example, a value 1120a indicates that, of the quantiles defined for the first dimension, a quantile with the identifier "Q23" includes the value 1110a of the speech frame 1110. The mapper 720a may generate the quantile identifier vector 1120 in the same manner that the vectors 451a-451c are generated for the speech frames 411a-411c of FIG. 4B.

In stage (D), the mapper 720a determines a probability 1125 of occurrence of the sequence of quantile identifiers in the quantile identifier vector 1120. To determine the probability 1125, the mapper 720a uses the n-gram multidimensional probability function of the non-parametric model 1115. The mapper 720a uses the stored conditional probabilities to generate the overall probability that the values in the quantile identifier vector 1120 occur together. The probability 1125 is calculated according to the following expression:

$$P(Q(y)) = \prod_{k=0}^{D-1} P(Q_{k,i(y_k)} | Q_{k-N+1,i(y_{k-N+1})} \cdots Q_{k-1,i(y_{k-1})}),$$

Q(y) where is the quantile identifier vector 1120, D is the total number of dimensions, N is the order of the n-gram model.

The term $Q_{k,i(y_k)}$ represents the quantile identifier for the k dimension, $i(y_k)$ identifies the index of the quantile Q at dimension k to which $y_k$ belongs, and $y_k$ is the k-th dimension of the speech frame $y=(y_0, \ldots, y_k, \ldots y_{\{D-1\}})$.

In some implementations, the mapper 720a uses a back-off strategy when calculating the probability 1125. Generally, when a particular sequence of quantile identifiers has occurred in training data, the conditional probability is easily generated. However, there may be n-grams (e.g., sequences of quantile identifiers) that were not observed in the training data or were very uncommon, and thus no conditional probability for the n-gram is stored in the non-parametric model 1115. In such instances, the mapper 720a decreases the amount of n-gram context on which a particular conditional probability is based. As a result, the probability 1125 may be generated using a combination of probabilities conditioned on different amounts of dimensional context, for example, based on probabilities of trigrams, bigrams, and unigrams.

For example, when a trigram model is used, trigrams having the full context in the model are typically used whenever possible. However, if a particular trigram is not described by the model, a bigram is used. The conditional probability for the bigram may be computed or estimated from the trigram probabilities or counts that are present in the non-parametric model 1115. If the bigram has not been observed (e.g., a conditional probability for the bigram is not included in and cannot be computed from the stored data), the mapper 720a backs off again to the unigram. In some implementations, the unigram is guaranteed to be described in the model. Based on the manner in which the quantiles are defined, samples are guaranteed to be located in each quantile. Substantially all of the quantile include the predetermined occupancy number of samples, permitting at least the unigram probability to be estimated.

As an example, to compute the probability 1124 a probability may be needed for quantile identifier Q10 in dimension D20, given the co-occurrence of quantile identifier Q15 in dimension D19 and quantile identifier Q17 in dimension D18. If a probability cannot be determined based on this sequence of quantile identifiers, the mapper 720a backs off and uses a probability based on a shorter sequence of quantile identifiers, such as a bigram. Using the bigram, the mapper 720a attempts to determine the probability of occurrence of quantile identifier Q10 in dimension D20, given the co-occurrence of quantile identifier Q15 in dimension D19. If this probability cannot be determined either, the mapper 720a backs off again to the unigram, ultimately using the probability of occurrence of quantile identifier Q10 in dimension D20, without specifying any context from other dimensions.

As another example of the back-off strategy, consider the sequence of quantile identifiers $\{B_1, B_2, B_3\}$. If this sequence occurs in a speech frame to be evaluated, a probability of occurrence of $B_3$ may be needed to generate the probability 1125. If the model includes the appropriate data, a trigram probability estimate, $P(B_3|B_1, B_2)$, is used. This probability can be determined based on stored counts as $\#(B_1, B_2, B_3)/\#(B_1, B_2, *)$. If a trigram probability is not available, a bigram probability estimate, $P(B_3|B_2)$, is used as the probability of occurrence of $B_3$, if available. The bigram probability estimate can be calculated based on stored counts as $\#(B_2, B_3)/\#(B_2, *)$. Finally, if neither $P(B_3|B_1, B_2)$ nor $P(B_3|B_2)$ are available, a unigram probability estimate, $P(B_3)$, is used as the probability of occurrence of $B_3$. The unigram probability estimate can be calculated based on stored counts as $\#(B_3)/\#(*)$. This same back-off strategy can be used for each of the conditional probabilities used to generate the probability 1125. Thus a single probability 1125 may be calculated using on a combination of trigram probability estimates, bigram probability estimates, and/or unigram probability estimates, since the back-off technique is used for each dimension.

In stage (E), the mapper 720a assigns probabilities 1130 to the actual values of the components of the speech frame 1110. For example, the mapper 720a determines probabilities 1130 that values within the quantiles designated by the quantile identifier vector 1120 would have the values as they occur in the speech frame 1110. Each dimension has a different probability 1130 assigned to it. In further detail, each likelihood 1130 represents the probability of the value of the input vector on a given dimension, given that this value falls within the specific quantile assigned for the speech frame 1110 at that dimension. In other words, given that a vector component of a speech frame has a value known to occur in a particular quantile in a particular dimension, the corresponding probability 1130 is the probability that the vector component has the specific value that occurs in the speech frame 1110 for that dimension. The mapper 720a determines the probabilities 1130 using the quantile-level probability functions of the non-parametric model 1115.

As an example, for dimension D1, the mapper 720a accesses the mean and variance of a Gaussian distribution corresponding to the quantile Q23. The mapper 720a uses this Gaussian distribution to determine, given that the value 1110a of the speech frame 1110 is already known to be within quantile Q23, the probability that the value 1110a is "2.3," as it is in the speech frame 1110 for dimension D1. In this example, the mapper 720a assigns a probability 1130a of "0.9" for the occurrence of the value "2.3" within the quantile Q23. The mapper 720a determines probabilities 1130 for the rest of the dimensions in a similar manner. For example, the mapper 720a uses the Gaussian distributions for the quantiles specified by the quantile identifier vector 1120 to determine the probabilities that values occurring within those quantiles would have the values present in the speech frame 1110. While the example of a Gaussian distribution is described, other probability functions can alternatively be used as quantile-level probability functions.

In stage (F), the mapper 720a determines a probability 1140 that the speech frame 1110 corresponds to the "sh_2" HMM state, given the phonetic context "ae k sh_n sil~." The probability 1140 is based on the probability 1125 of the occurrence of the quantile identifier vector 1120, determined as $P(Q(y))$ in stage (D). The probability is also based on the probabilities 1130 that values within the various quantiles have the values of the respective speech frame values 1110, determined in stage (E).

The probability 1140 can be calculated as $P(y)$, as follows:

$$P(y)=P(Q(y)) \cdot \Pi_{d=1}^{D} P(y_d | \mathcal{N}(Q_{d,i(y_d)})),$$

where $P(Q(y))$ is the probability 1125 and $\Pi_{d=1}^{D} P(y_d | \mathcal{N}(Q_{d,i(y_d)}))$ is the product of each of the probabilities 1130. The probability 1140 can be used as a probability score 908, or a probability score may be generated as a function of the probability 1140.

The example of FIG. 11 illustrates assigning a probability to a single speech frame. As shown in FIG. 9, probabilities are assigned to each of the different speech frames in an input speech signal to be recognized. Many different non-parametric models within the acoustic model 140 can be used to assign probabilities to the various speech frames derived from an input speech signal. As shown in FIG. 9, the probabilities for many different speech frames, each produced using the non-parametric models for different M-phones, are combined to obtain an overall probability for the input speech signal, such as the overall scores 922, 932.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
   receiving, from a client device over a computer network, audio data that describes an utterance of a user;
   accessing, by the one or more computers, stored data of an acoustic model that was generated by:
      accessing, by a data processing apparatus, speech data that represents utterances of a particular phonetic unit occurring in a particular phonetic context, the speech data comprising values for multiple dimensions;
      determining, by the data processing apparatus, boundaries for a set of quantiles for each of the multiple dimensions;
      generating, by the data processing apparatus and for each of the quantiles, a model that models the distribution of values within the quantile;
      generating, by the data processing apparatus, a multidimensional probability function that indicates, for input speech data representing speech occurring in the particular phonetic context, a probability that the input speech data will have values that correspond to a given set of the quantiles for the multiple dimensions, wherein generating the multidimensional probability function comprises generating an n-gram model wherein the n-grams are sequences of quantile identifiers and the sequences include quantile identifiers for quantiles in at least two dimensions; and
      storing, by the data processing apparatus, data indicating the boundaries of the quantiles, the models for the distribution of values in the quantiles, and the multi-dimensional probability function;
   using, by the one or more computers, the stored data indicating the boundaries of the quantiles, the models for the distribution of values in the quantiles, and the multidimensional probability function to perform speech recognition for an utterance; and
   providing, to the client device and over the computer network, the transcription for the utterance.

2. The method of claim 1, wherein generating the multidimensional probability function comprises generating a multidimensional probability function that indicates, for an input speech frame representing speech occurring in the particular phonetic context, a probability that the input speech frame will have values that correspond to a given set of the quantiles for the multiple dimensions, where the input speech frame is a multidimensional real-valued vector.

3. The method of claim 1, wherein determining the boundaries for the set of quantiles for each of the multiple dimensions comprises determining the boundaries for equal occupancy quantiles such that each of the equal occupancy quantiles includes an equal number of values from the accessed speech data, each equal occupancy quantile representing a range of values in a dimension that does not overlap with any other equal occupancy quantile.

4. The method of claim 1, wherein generating models for the distribution of values within the quantiles comprises generating, for each of the quantiles, a univariate Gaussian distribution based on values in the speech data that correspond to the quantile.

5. The method of claim 1, wherein generating the generating the multidimensional probability function comprises determining the number and identity of the n-grams for which data is included in the n-gram model based on the accessed speech data.

6. The method of claim 1, wherein determining boundaries for the set of quantiles for each of the multiple dimensions comprises determining the boundaries such that the number of quantiles in the set of quantiles for each of the multiple dimensions is based on the accessed speech data.

7. The method of claim 1, wherein generating the multi-dimensional probability function comprises determining conditional probabilities that each indicate a probability that a value in a first dimension will be in a particular quantile of the first dimension given at least that a value in a second dimension occurs in a particular quantile of the second dimension.

8. The method of claim 1, further comprising generating other portions of the acoustic model using a plurality of processing nodes, each processing node being assigned different sequences of phonetic units, each of the different processing nodes performing accessing, determining, generating of models, generating of a multi-dimensional probability function, and storing for each of its assigned sequences of phonetic units to generate portions of the acoustic model corresponding to the assigned sequences of phonetic units.

9. The method of claim 1, wherein using the stored data to determine the transcription for the utterance comprises using the portions of the acoustic model generated by the different processing nodes to determine a transcription for the utterance.

10. The method of claim 1, wherein accessing the speech data comprises accessing speech data that represents multiple utterances of a particular phonetic unit that each occur in a same, particular phonetic context that comprises one or more additional phonetic units, the speech data comprising values for multiple dimensions for each of the multiple utterances;
   wherein determining the boundaries for a set of quantiles comprises determining boundaries for a set of quantiles for each of the multiple dimensions based on the speech data that represents multiple utterances of the particular phonetic unit occurring in the particular phonetic context that includes the one or more additional phonetic units;
   wherein generating the multidimensional probability function comprises generating a multidimensional probability function that indicates, for input speech data representing speech occurring in the particular phonetic context that includes the one or more additional phonetic units, a probability that the input speech data will have values that correspond to a given set of the quantiles for the multiple dimensions; and
   wherein storing the data comprises storing data indicating the boundaries of the quantiles, the models for the distribution of values in the quantiles, and the multidimensional probability function as a portion of an acoustic model corresponding to the particular phonetic unit occurring in the particular phonetic context that include the one or more additional phonetic units.

11. A system comprising:
one or more computers and one or more storage devices storing instructions that are operable, when executed by the one or more computers, to cause the one or more computers to perform operations comprising:
receiving, from a client device over a computer network, audio data that describes an utterance of a user;
accessing stored data of an acoustic model that was generated by:
accessing speech data that represents utterances of a particular phonetic unit occurring in a particular phonetic context, the speech data comprising values for multiple dimensions;
determining boundaries for a set of quantiles for each of the multiple dimensions;
generating, for each of the quantiles, a model that models the distribution of values within the quantile;
generating a multidimensional probability function that indicates, for input speech data representing speech occurring in the particular phonetic context, a probability that the input speech data will have values that correspond to a given set of the quantiles for the multiple dimensions, wherein generating the multidimensional probability function comprises generating an n-gram model wherein the n-grams are sequences of quantile identifiers and the sequences include quantile identifiers for quantiles in at least two dimensions;
storing data indicating the boundaries of the quantiles, the models for the distribution of values in the quantiles, and the multidimensional probability function;
using the stored data indicating the boundaries of the quantiles, the models for the distribution of values in the quantiles, and the multidimensional probability function to determine a transcription for the utterance; and
providing, to the client device and over the computer network, the transcription for the utterance.

12. The system of claim 11, wherein generating the multidimensional probability function comprises generating a multidimensional probability function that indicates, for an input speech frame representing speech occurring in the particular phonetic context, a probability that the input speech frame will have values that correspond to a given set of the quantiles for the multiple dimensions, where the input speech frame is a multidimensional real-valued vector.

13. The system of claim 11, wherein determining the boundaries for the set of quantiles for each of the multiple dimensions comprises determining the boundaries for equal occupancy quantiles such that each of the equal occupancy quantiles includes an equal number of values from the accessed speech data, each equal occupancy quantile representing a range of values in a dimension that does not overlap with any other equal occupancy quantile.

14. The system of claim 11, wherein generating models for the distribution of values within the quantiles comprises generating, for each of the quantiles, a univariate Gaussian distribution based on values in the speech data that correspond to the quantile.

15. The system of claim 11, wherein generating the generating the multidimensional probability function comprises determining the number and identity of the n-grams for which data is included in the n-gram model based on the accessed speech data.

16. The system of claim 11, wherein determining boundaries for the set of quantiles for each of the multiple dimensions comprises determining the boundaries such that the number of quantiles in the set of quantiles for each of the multiple dimensions is based on the accessed speech data.

17. The system of claim 11, wherein accessing the speech data comprises accessing speech data that represents multiple utterances of a particular phonetic unit that each occur in a same, particular phonetic context that comprises one or more additional phonetic units, the speech data comprising values for multiple dimensions for each of the multiple utterances;
wherein determining the boundaries for a set of quantiles comprises determining boundaries for a set of quantiles for each of the multiple dimensions based on the speech data that represents multiple utterances of the particular phonetic unit occurring in the particular phonetic context that includes the one or more additional phonetic units;
wherein generating the multidimensional probability function comprises generating a multidimensional probability function that indicates, for input speech data representing speech occurring in the particular phonetic context that includes the one or more additional phonetic units, a probability that the input speech data will have values that correspond to a given set of the quantiles for the multiple dimensions; and
wherein storing the data comprises storing data indicating the boundaries of the quantiles, the models for the distribution of values in the quantiles, and the multidimensional probability function as a portion of an acoustic model corresponding to the particular phonetic unit occurring in the particular phonetic context that include the one or more additional phonetic units.

18. A non-transitory computer storage medium storing a computer program, the program comprising instructions that when executed by one or more computers cause the one or more computers to perform operations comprising:
receiving, from a client device over a computer network, audio data that describes an utterance of a user;
accessing stored data of an acoustic model that was generated by:
accessing speech data that represents utterances of a particular phonetic unit occurring in a particular phonetic context, the speech data comprising values for multiple dimensions;
determining boundaries for a set of quantiles for each of the multiple dimensions;
generating, for each of the quantiles, a model that models the distribution of values within the quantile;
generating a multidimensional probability function that indicates, for input speech data representing speech occurring in the particular phonetic context, a probability that the input speech data will have values that correspond to a given set of the quantiles for the multiple dimensions, wherein generating the multidimensional probability function comprises generating an n-gram model wherein the n-grams are sequences of quantile identifiers and the sequences include quantile identifiers for quantiles in at least two dimensions;
storing data indicating the boundaries of the quantiles, the models for the distribution of values in the quantiles, and the multidimensional probability function;
using the stored data indicating the boundaries of the quantiles, the models for the distribution of values in the quantiles, and the multidimensional probability function to determine a transcription for the utterance; and providing, to the client device and over the computer network, the transcription for the utterance.

19. The non-transitory computer storage medium of claim 18, wherein generating the generating the multidimensional probability function comprises determining the number and identity of the n-grams for which data is included in the n-gram model based on the accessed speech data.

20. The non-transitory computer storage medium of claim 18, wherein accessing the speech data comprises accessing speech data that represents multiple utterances of a particular phonetic unit that each occur in a same, particular phonetic context that comprises one or more additional phonetic units, the speech data comprising values for multiple dimensions for each of the multiple utterances;

wherein determining the boundaries for a set of quantiles comprises determining boundaries for a set of quantiles for each of the multiple dimensions based on the speech data that represents multiple utterances of the particular phonetic unit occurring in the particular phonetic context that includes the one or more additional phonetic units;

wherein generating the multidimensional probability function comprises generating a multidimensional probability function that indicates, for input speech data representing speech occurring in the particular phonetic context that includes the one or more additional phonetic units, a probability that the input speech data will have values that correspond to a given set of the quantiles for the multiple dimensions; and wherein storing the data comprises storing data indicating the boundaries of the quantiles, the models for the distribution of values in the quantiles, and the multidimensional probability function as a portion of an acoustic model corresponding to the particular phonetic unit occurring in the particular phonetic context that include the one or more additional phonetic units.

* * * * *